United States Patent [19]

Hoshino et al.

[11] Patent Number: 5,469,271
[45] Date of Patent: Nov. 21, 1995

[54] UNIFIED COMPACT VIDEO CAMERA AND VCR

[75] Inventors: Mitsuo Hoshino, Saitama; Yuka Tsutsumi, Tokyo; Mitsuhiro Shimada, Chiba; Takashi Masuda; Yuji Morimiya, both of Kanagawa; Yoshihiro Ide, Tokyo; Takashi Kawaguchi, Kanagawa; Yuichiro Nogo, Tokyo, all of Japan

[73] Assignee: Sony Corporation, Tokyo, Japan

[21] Appl. No.: 222,314

[22] Filed: Apr. 1, 1994

Related U.S. Application Data

[63] Continuation of Ser. No. 527,374, May 23, 1990, abandoned.

[30] Foreign Application Priority Data

| May 30, 1989 | [JP] | Japan | 1-136355 |
| May 30, 1989 | [JP] | Japan | 1-136356 |
| May 30, 1989 | [JP] | Japan | 1-136357 |
| May 30, 1989 | [JP] | Japan | 1-136358 |

[51] Int. Cl.$^6$ .................................................. H04N 5/247
[52] U.S. Cl. .................. 358/335; 358/906; 358/909.1; 348/375
[58] Field of Search .................. 358/906, 335, 358/909.1; 360/33.1; 348/374, 375, 376; H04N 5/247, 5/225

[56] References Cited

U.S. PATENT DOCUMENTS

| 4,511,932 | 4/1985 | Ushiro | 358/227 |
| 4,550,343 | 10/1985 | Nakatani | 358/229 |
| 4,772,902 | 9/1988 | Inoue et al. | 358/229 |
| 4,885,643 | 12/1989 | Ichimura et al. | 358/335 |
| 4,959,729 | 9/1990 | Fukuda et al. | 358/335 |

FOREIGN PATENT DOCUMENTS

0050677 2/1989 Japan.

Primary Examiner—Tommy P. Chin
Assistant Examiner—Huy Nguyen
Attorney, Agent, or Firm—William S. Frommer; Alvin Sinderbrand

[57] ABSTRACT

A unified compact video camera and video cassette recording and/or reproducing apparatus (VCR) has a video camera unit and a VCR unit which includes a cassette holder arranged in a common hollow body at opposite sides of its median plane, and a grip strap extends along the body at the outside of the cassette holder so that the opposite side of the body is available for the positioning thereat of various control switches for operating the video camera and VCR units.

18 Claims, 20 Drawing Sheets

UNIFIED COMPACT VIDEO CAMERA AND VCR

This application is a continuation of application Ser. No. 07/527,347, filed May 23, 1990, abandoned.

BACKGROUND OF THE INVENTION

1. Field of the Invention

This invention relates generally to a unified video camera and video cassette recording and/or reproducing apparatus (VCR), and more particularly is directed to the provision of such unified video camera and VCR which is compact and light in weight so as to be conveniently portable.

2. Description of the Prior Art

In a typical unified video camera and VCR, a video camera unit and a VCR unit are contained in a common housing or hollow body. It will be appreciated that, for controlling the operations of the video camera and the VCR, it is usual to provide numerous control switches or buttons which are positioned at the surface of the body for easy access thereto. For example, for controlling the operations of the video camera, it is usual to provide a focus control button, power zoom control buttons, a shutter speed select button, a white balance control button, a fader button and a back-light button. For controlling the operations of the VCR, it is usual to provide a recording button, a playback button, a pause button, a fast-forward button and a rewinding button. For ease in selectively actuating the various switches or buttons provided for controlling operations of the video camera and VCR, it is desirable that the buttons or other switch actuating members to be engaged by the operator's fingers have sufficient surface areas and be sufficiently spaced apart on the exterior of the hollow body or housing. Accordingly, in providing a compact unified video camera and VCR, for example, of a size equivalent to that of a passport so that it can be readily cradled in the operator's hand, difficulty is encountered in arranging the various operation controlling switches or buttons on the available surface area of the small housing or body. The foregoing difficulty is increased by the presence of substantial dead space of unusable surface area on the housing or hollow body. For example, the VCR typically includes a cassette holder which is mounted for movement between a loading position and an eject position projecting beyond the normal external contours of the housing or body. By reason of such movement, the surface area corresponding to the extent of the cassette holder is usually considered dead or unusable space for the location of the controlling switches or buttons. Furthermore, in the case of a unified video camera and VCR of the type intended to be held or cradled in the palm of the operator's hand, a strap is usually provided along, and is spaced from a side surface of the body so that the operator's hand can be extended between the strap and the underlying surface of the housing or body. Since the surface of the body underlying the strap has force applied thereto when the unified camera and VCR is handled or cradled in the operator's hand, such area of the housing is also considered dead space, that is, unsuitable for the placement of control switches or buttons thereat. Thus, a substantial proportion of the surface area of the housing or body of the known unified video camera and VCR is dead space, so that reduction of the overall size of the housing is limited by the need to ensure that the remaining surface area of the housing will be sufficient for the convenient location of the various required control switches and buttons thereon.

It is further known to provide a unified video camera and VCR with a viewfinder through which the image being recorded can be readily monitored. Typically, a cathode-ray tube (CRT) is used in an electronic viewfinder for displaying the image being received by an image pick-up device in the video camera. An electronic viewfinder of the type using a CRT screen usually requires a relatively large space therefor, with the result that the viewfinder tends to project beyond the housing or body of the unified video camera and VCR and thereby further resists reduction of the overall size of the device.

OBJECTS AND SUMMARY OF THE INVENTION

Accordingly, it is an object of this invention to provide a unified video camera and VCR which avoids the above mentioned problems associated with the prior art.

More specifically, it is an object of this invention to provide a unified video camera and VCR of minimum size and weight, and which has an optimal layout or arrangement of the control switches and buttons required for operation of the video camera and VCR.

Another object of this invention is to provide a unified video camera and VCR, as aforesaid, with a viewfinder which further permits reduction of the overall size of the device.

A further object of this invention is to provide a unified video camera and VCR, as aforesaid, in which the proportion of the surface of the housing or body constituting dead space is minimized by arranging a strap for use in gripping or holding the body at the same side of the latter as a cassette holder so that the opposite side of the body is available for positioning of the various switches and buttons by which operations of the video camera and the VCR are controlled.

In accordance with an aspect of this invention, a unified compact video camera and video cassette recording and/or reproducing apparatus (VCR) comprises a hollow body defining an interior space having a longitudinally extending median plane and an opening at the top and a side of the body to one side of such plane, a video camera unit including a camera lens assembly disposed in the interior space and being offset toward the other side of the median plane, a video cassette recording and/or reproducing (VCR) unit disposed in the interior space and being offset toward the same side of the median plane as the opening, such VCR unit being in longitudinally overlapping relation to the video camera unit and including a cassette holder compartment movable between a loading position wholly within the body and an eject position in which a video cassette in the holder compartment projects out of the opening, and a grip strap extending along the exterior of the body at the same side as the cassette holder compartment and being attached, at its ends, to a lower portion of the body so that an operator's hand can extend upwardly between the strap and the adjacent side of the body for cradling such body in the palm of the hand.

Preferably, in a unified compact video camera and VCR, as aforesaid, a lid is pivotally mounted on the body for movement between a closed position for closing the opening at the top of the body when the cassette holder compartment is in its loading position and an opened position leaving the opening of the body unobstructed for movement of the cassette holder compartment to its eject position. In such case, an eject control button actuable for causing movement of the cassette holder compartment to its eject position is desirably disposed at the top of the body in a location covered by the lid in the closed position of the latter so that access to the eject control button for actuating the latter may be had only when the lid is in its opened position. Further, when the camera lens assembly has a power zoom mechanism, a zoom control switch for the power zoom mechanism is desirably mounted on the lid so that, in the closed position of the lid, the zoom control switch is actuable by fingers of the operator's hand cradling the body.

It is another feature of this invention to provide a unified video camera and VCR, as aforesaid, with first and second arrays of switches for controlling operations of the video camera unit and of the VCR unit, respectively, and which are arranged at the outside of the body away from the side containing the cassette holder compartment and across which the grip strap extends.

In accordance with still another feature of this invention, a unified video camera and VCR, as aforesaid, has a record start and stop switch disposed at the outside of the rear portion of its body at the same side as the grip strap so as to be actuable by a thumb of the operator's hand cradling the body. Furthermore, a lock is associated with such record start and stop switch and is movable between a locking position for locking the start and stop switch in a stop condition and a stand-by position in which said start and stop switch is actuable to a record start condition. Such lock may be in the form of a rotary member movable between a first angular position corresponding to the locking position and a second angular position corresponding to the stand-by position, and in which a radial extension of the rotary member is oriented to provide a rest for the operator's thumb.

In accordance with yet another aspect of this invention, a unified video camera and VCR comprises a hollow body defining an interior space having a longitudinally extending median plane and an opening along the top and a side of the body to one side of such plane, a video camera unit including a camera lens assembly disposed in the interior space and being offset toward the other side of the median plane, a video cassette recording and/or reproducing (VCR) unit disposed in the interior space and being offset toward said one side of the median plane in longitudinally overlapping relation to the video camera unit, such VCR unit including a cassette holder compartment movable between a loading position wholly within the body and an eject position in which a video cassette in the holder compartment projects out of the opening, and a viewfinder disposed at the same side of the median plane as the video camera, but above the latter, and being variable in axial length in a telescopic manner between a retracted condition when not in use and an expanded operative condition in which the viewfinder is substantially longer than the body.

In a desirable embodiment of the invention, a unified video camera and VCR, as aforesaid, has a recess extending along an upper portion of the body at the same side of the median plane as the viewfinder, and the viewfinder is pivotally mounted on the body for pivoting between a first angular position or orientation in which the viewfinder is substantially nested in the recess and a second angular position in which the viewfinder extends obliquely out of the recess.

The above, and other objects, features and advantages of the present invention, will be apparent in the following detailed description of a preferred embodiment of the invention when read in connection with the accompanying drawings forming a part hereof, and wherein corresponding parts are identified by the same reference numerals in the several views of the drawings.

DESCRIPTION OF THE PREFERRED EMBODIMENT

Figure 1:
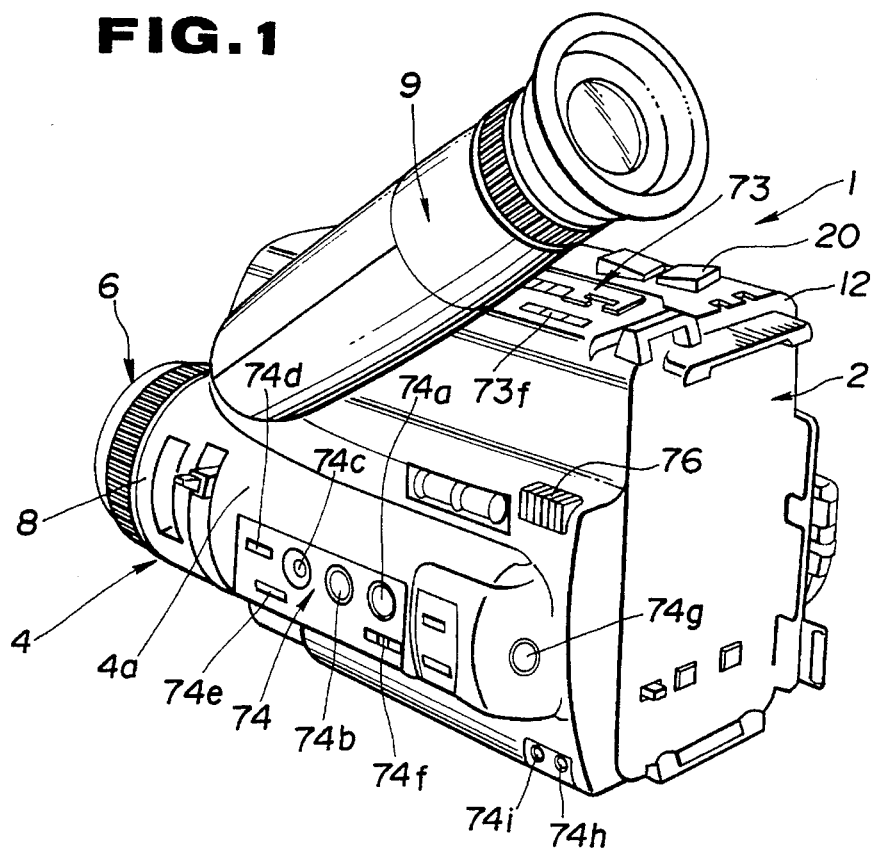
FIG. 1 is a perspective view of a compact and light weight unified video camera and VCR according to an embodiment of the present invention.
Figure 2:
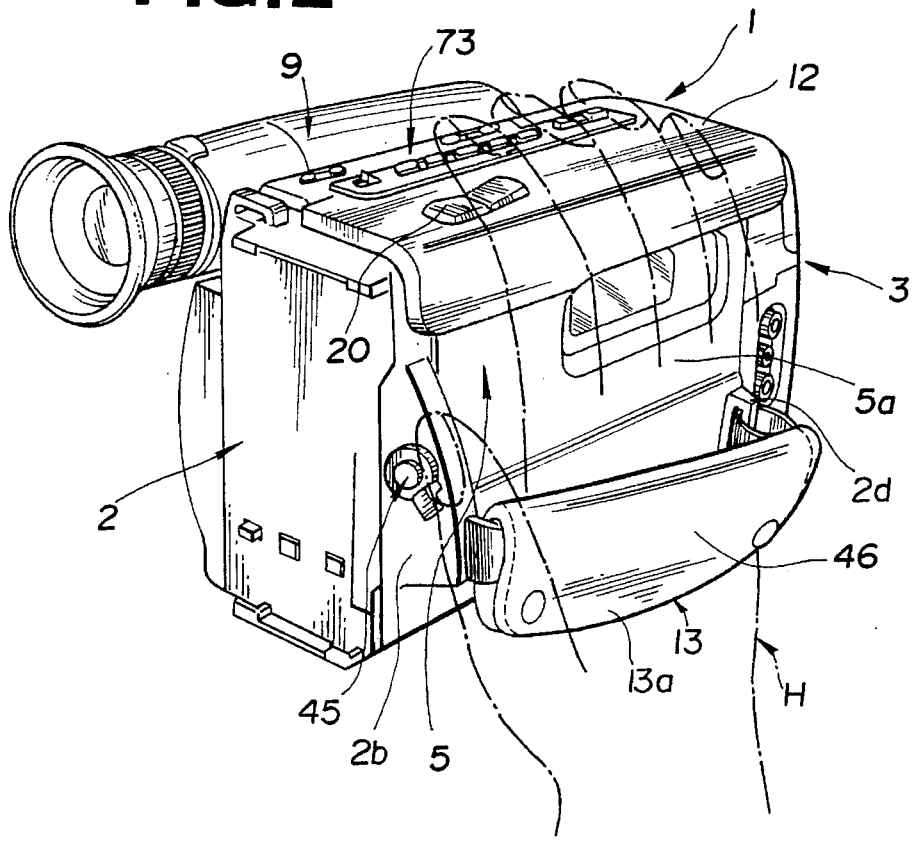
FIG. 2 is a perspective view similar to that of FIG. 1, but showing the unified video camera and VCR as viewed from the opposite side thereof.
Figure 3:
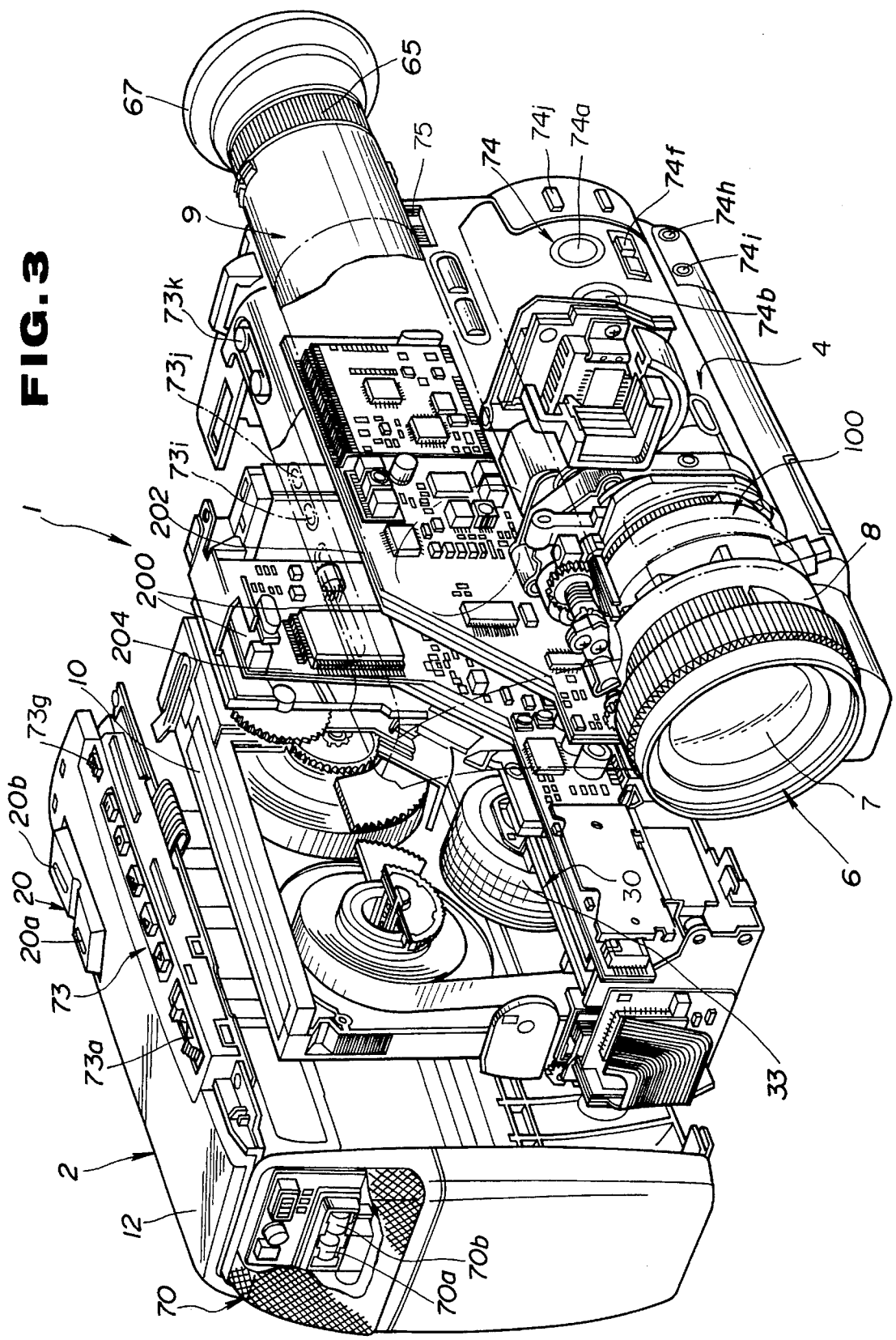
FIG. 3 is an enlarged, exploded perspective view, partly cut away and in section, of the unified video camera and VCR of FIGS. 1 and 2.
Figure 4:
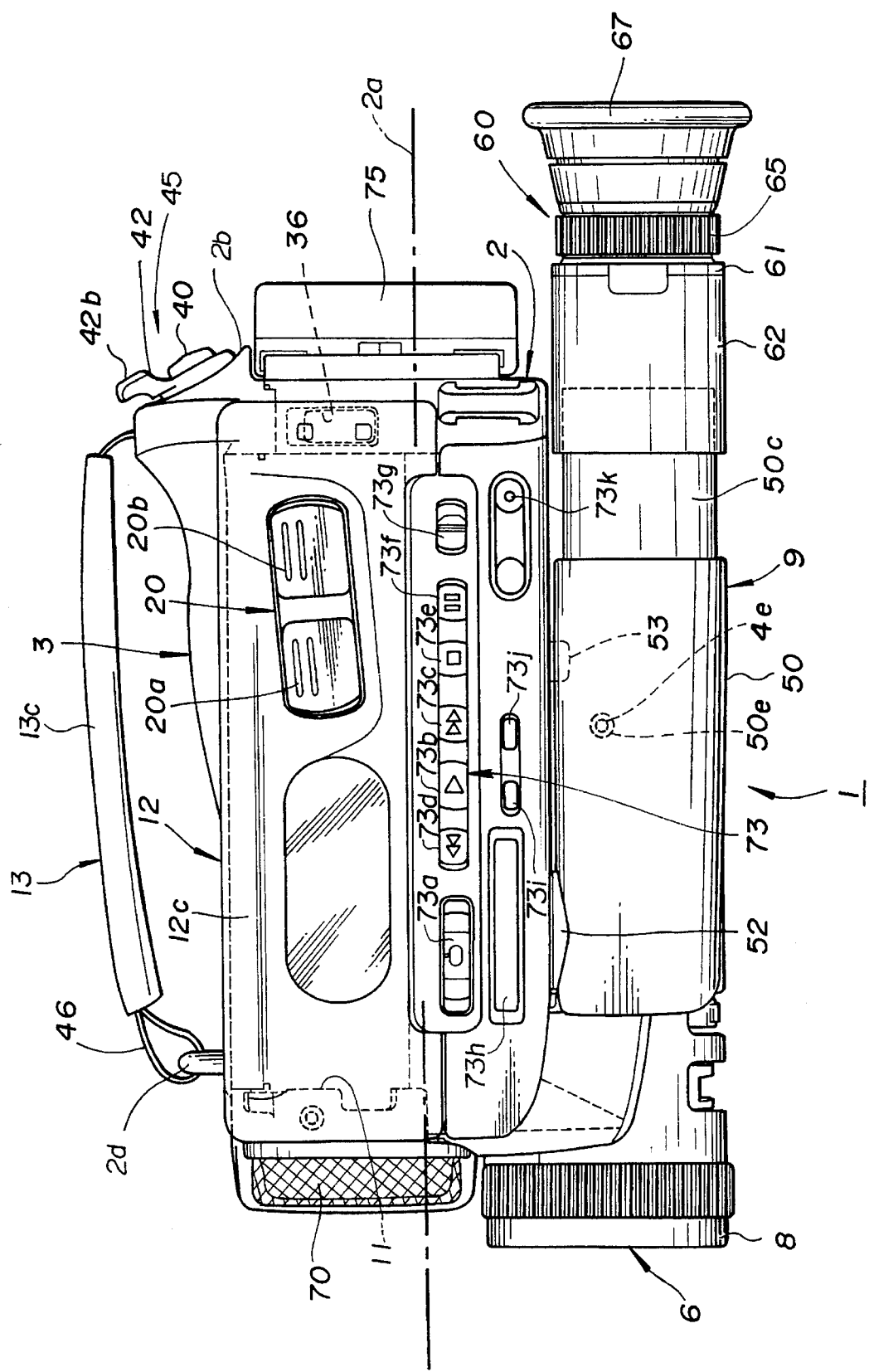
FIG. 4 is a top plan view of the unified video camera and VCR shown on FIGS. 1–3.

Referring to the drawings in detail, and initially to FIGS. 1–3 thereof, it will be seen that a unified compact video camera and VCR 1 according to an embodiment of the present invention generally comprises a hollow body or housing 2 which is generally of rectangular box-shaped configuration and has a longitudinally extending median plane, for example, as indicated by the dot-dash line 2a on FIG. 4, a video camera unit 4 offset to one side of the median plane 2a within the housing 2, and a video cassette recording and/or reproducing (VCR) unit generally indicated at 3 and which is disposed in the hollow body 2 toward the other side of the median plane 2a in longitudinally overlapping relation to the video camera unit 4.

Figure 6:
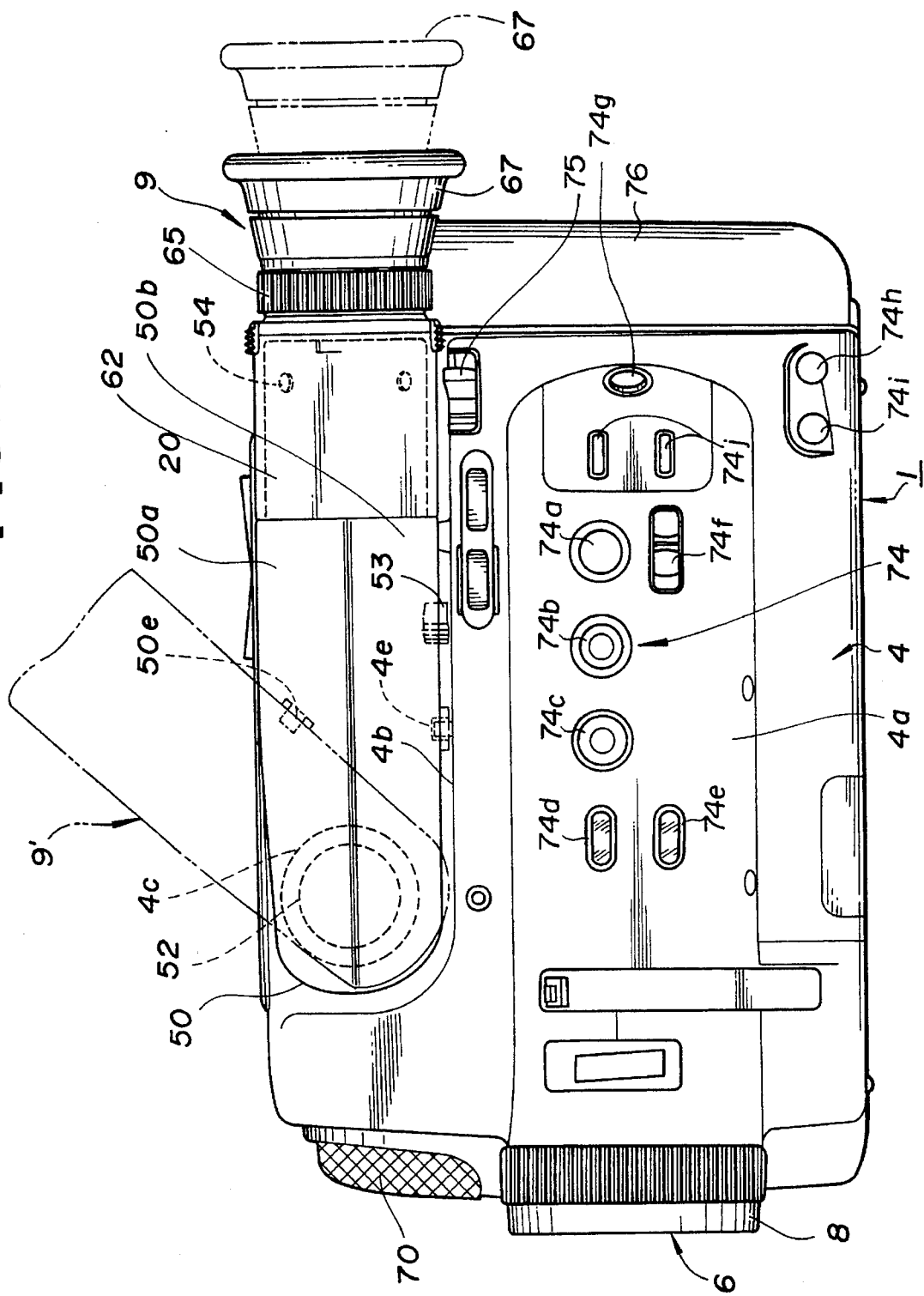
FIG. 6 is a side elevational view of the unified video camera and VCR, as viewed from the side thereof opposite to that shown on FIG. 5.
Figure 7:
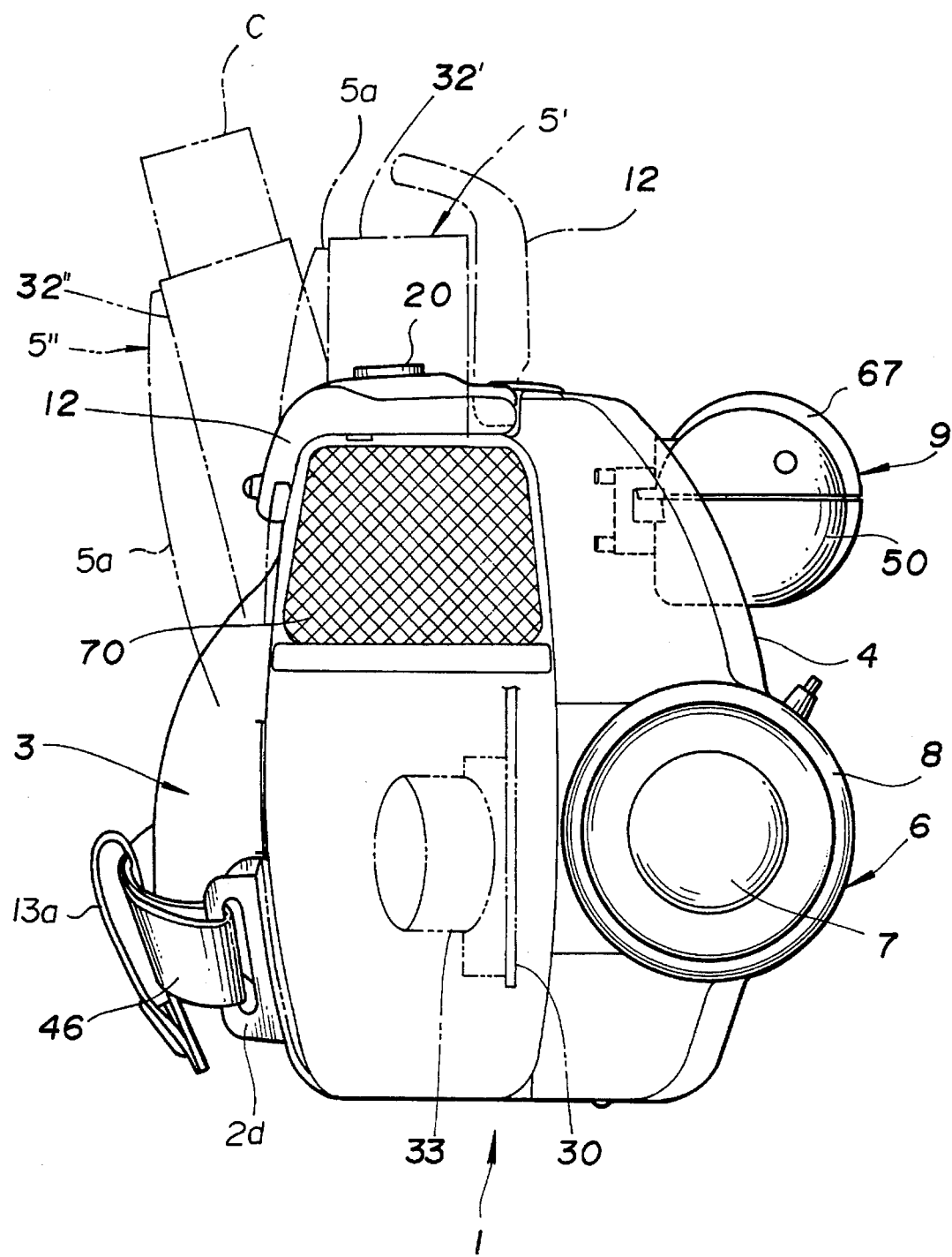
FIG. 7 is a front elevational view of the unified video camera and VCR of FIGS. 1–6.

As shown particularly on FIGS. 1 and 6, the side of the body 2 which accommodates the video camera unit 4 is formed with a bulbous protrusion 4a extending along the lower portion of the body 2 and forming a receptacle for a camera lens assembly 6 which has a power zooming capability and is a component of the video camera unit 4. The camera lens assembly 6 has a lens cylinder 8 extending from the forward end or mouth of the receptacle 4a and carrying an objective lens 7 (FIGS. 3 and 7).

Figure 18A:
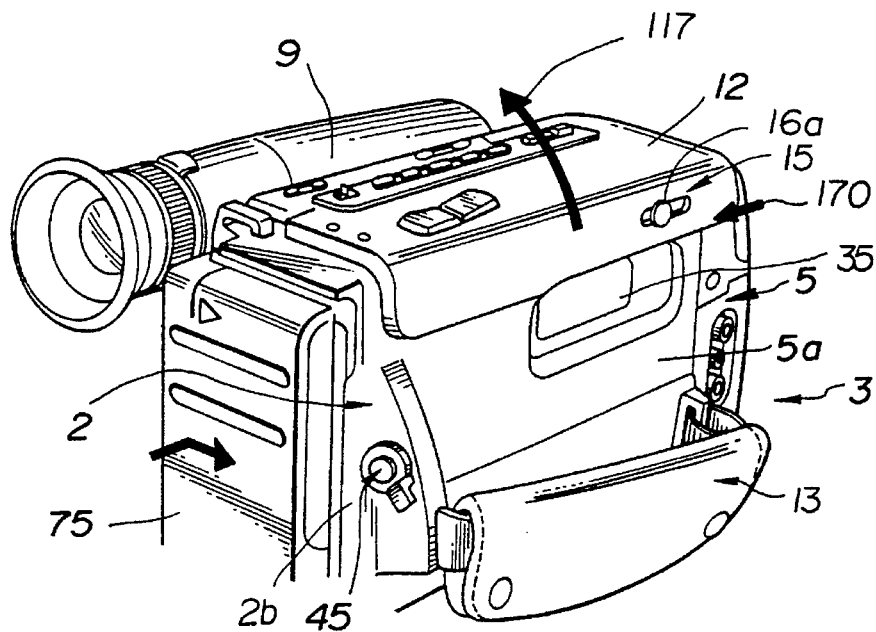
FIGS. 18A–18E are perspective views illustrating successive steps in the removal and insertion of a tape cassette in the cassette holder compartment of the illustrated embodiment of the invention, and to which reference will be made in explaining such operations.

Continuing with the general description of the unified video camera and VCR 1, it will be seen that the VCR unit 3 includes a cassette compartment holder assembly 5 which, in its loading position and as shown on FIG. 2, defines an upper side wall portion 5a of the body 2 at the side of the latter remote from the bulbous protrusion 4a. As hereinafter described in detail, the cassette compartment holder assembly 5 is adapted to receive a video cassette C (FIGS. 7, 18D and 18E), for example, an 8-mm video tape cassette, and to eject the same through an opening 11 (FIGS. 5 and 18B) extending along the top and a side of the body 2 at the same side of the longitudinal median plane as the VCR unit 3. A lid 12 is pivoted on the top of the body 2 for closing the top portion of opening 11 and thereby covering and protecting the cassette C in the cassette compartment holder assembly 5 when the latter is disposed in a loading position, as hereinafter described in detail.

A viewfinder assembly 9 is mounted on the body 2 at the same side as the video camera unit 4 but is disposed above the camera lens assembly 6 in the protrusion 4a.

A grip strap assembly 13 extends along the lower portion of the body 2 at the side of the latter having the upper side wall portion 5a and is attached, at its ends, to the body 2 so that an operator's hand can extend upwardly between the strap assembly 13 and the adjacent side of the body 2, as indicated at H, for cradling the body 2 in the palm of the hand when operating the unified video camera and VCR 1.

A switch array 73 for controlling operation of the VCR unit 3 is provided along the top of the body 2 adjacent the inner longitudinal edge of the opening 11 (FIG. 4), that is, adjacent the longitudinal edge of the lid 12 which is pivotally connected with the body 2, as hereinafter described. The switches included in the array 73 for controlling the operation of the VCR unit 3 include a power switch 73a, a series of tape transport control buttons including a normal playback button 73b, a fast-forward button 73c, a rewind button 73d, a stop button 73e and a pause button 73f, and a recording switch 73g. Also provided on the top of the body 2 adjacent the switch array 73 are a display 73h which may include a counter indicator, a zero memory indicator, a clock indicator and the like, a counter reset button 73i, a zero memory button 73j and an edit search button 73k (FIG. 4).

Figure 9:
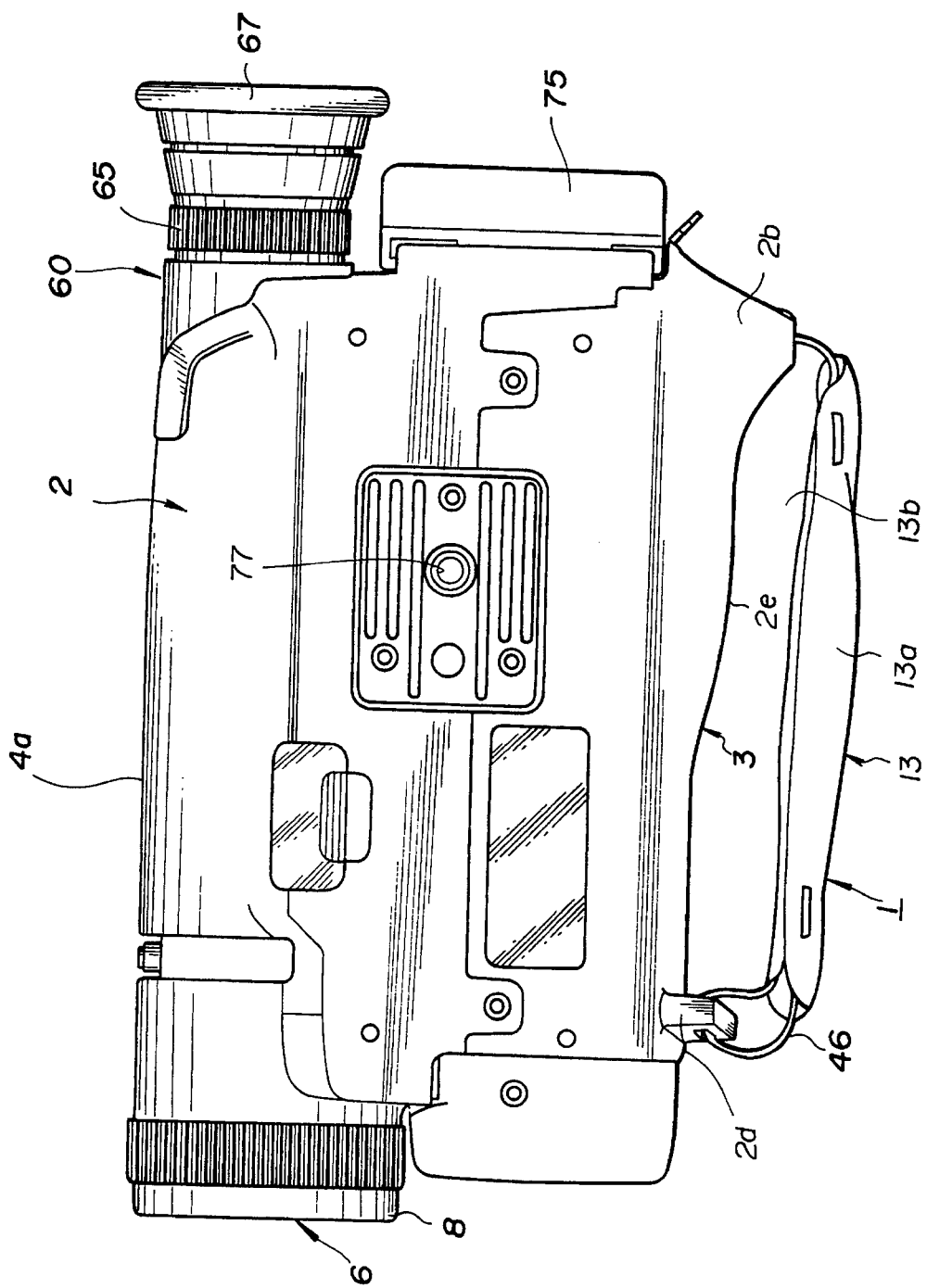
FIG. 9 is a bottom plan view of the unified video camera and VCR of FIGS. 1–8.

As shown on FIGS. 1, 3 and 6, a switch array 74 for controlling the operations of the video camera unit 4 is provided on the bulbous protrusion 4a of the body 2 and includes a manual focus switch 74a, a white balance switch 74b, a shutter speed adjusting switch 74c, a fader switch 74d, a back light switch 74e and an auto lock switch 74f which is normally set to the left or green auto lock position. Also provided on the protrusion 4a are a superimpose button 74g and date and time buttons 74j which may be actuated to display the date and time, respectively. Beneath the protrusion 4a there are provided an earphone jack 74h and a remote jack 74i at which reproduced audio sound is output. A battery eject knob or button 75 is provided near the back-end of the body 2 above the protrusion 4a and is actuable for releasing a battery package 76 (FIG. 6) from the back-end of the body 2. A receptacle 77 (FIG. 9) is provided at the bottom of the body 2 for attachment of the latter to a suitable tripod.

A built-in microphone assembly 70 is provided at the front end of the body 2 for picking up audio information. In the illustrated embodiment, particularly as shown on FIG. 3, the microphone assembly 70 includes a pair of omni-directional microphones 70a and 70b which are arranged in opposition to each other in the horizontal direction. Such arrangement of the microphone assembly 70 ensures that the desired audio sounds will be picked up while avoiding the recording of screams or other background noise. Further, sounds reflected by the body 2, such as, for example, motor noises, are not picked up by the microphones 70a and 70b so that such motor noises are excluded from the recorded sound. As shown particularly on FIG. 5, a video signal input/output terminal 71 and an audio signal input/output terminal 72 are provided in the front end portion of the body 2 at the side thereof which accommodates the VCR unit 3.

Figure 5:
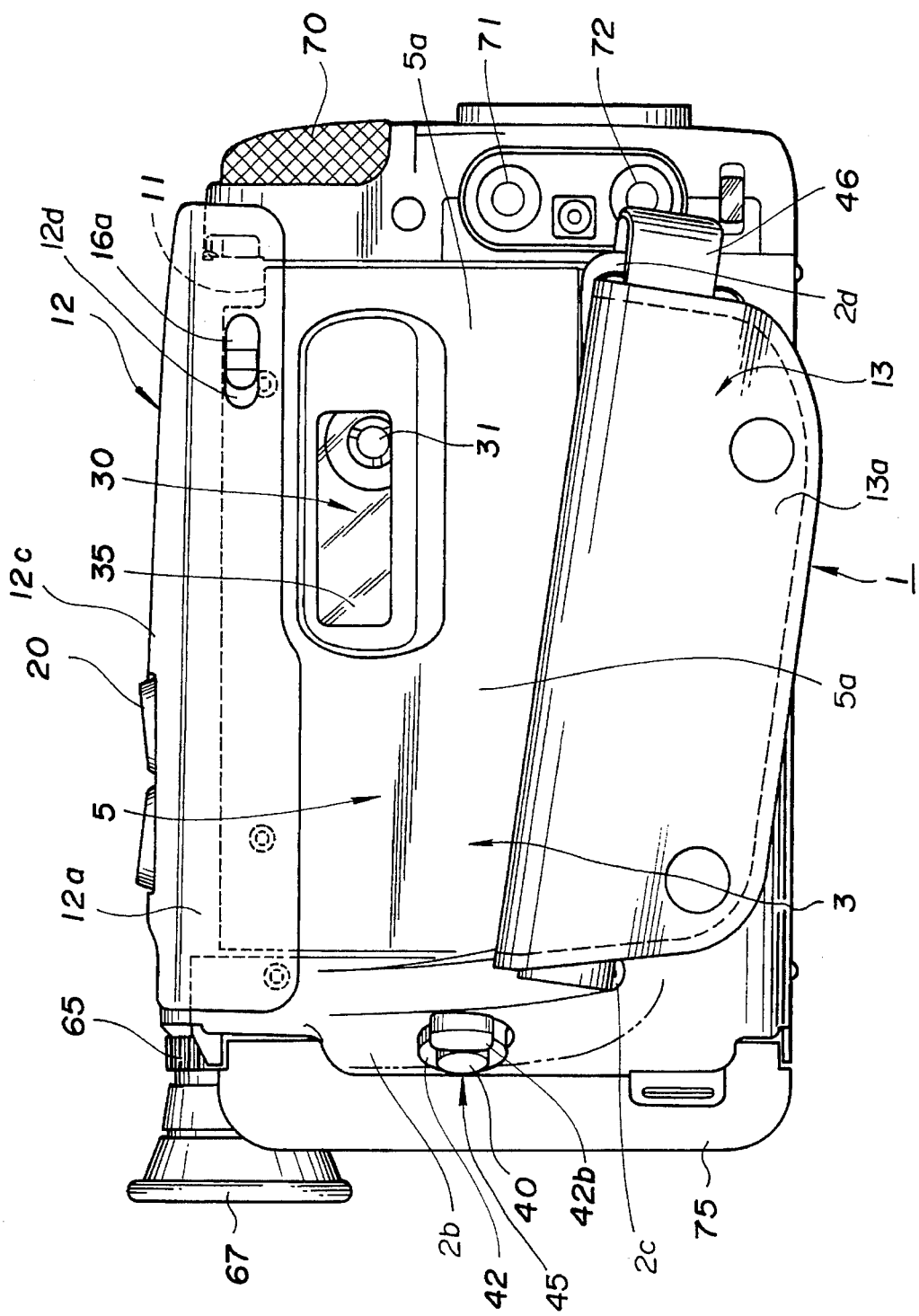
FIG. 5 is a side elevational view of the unified video camera and VCR of FIGS. 1–4 as viewed from the side thereof where a cassette holder compartment is situated.
Figure 10:
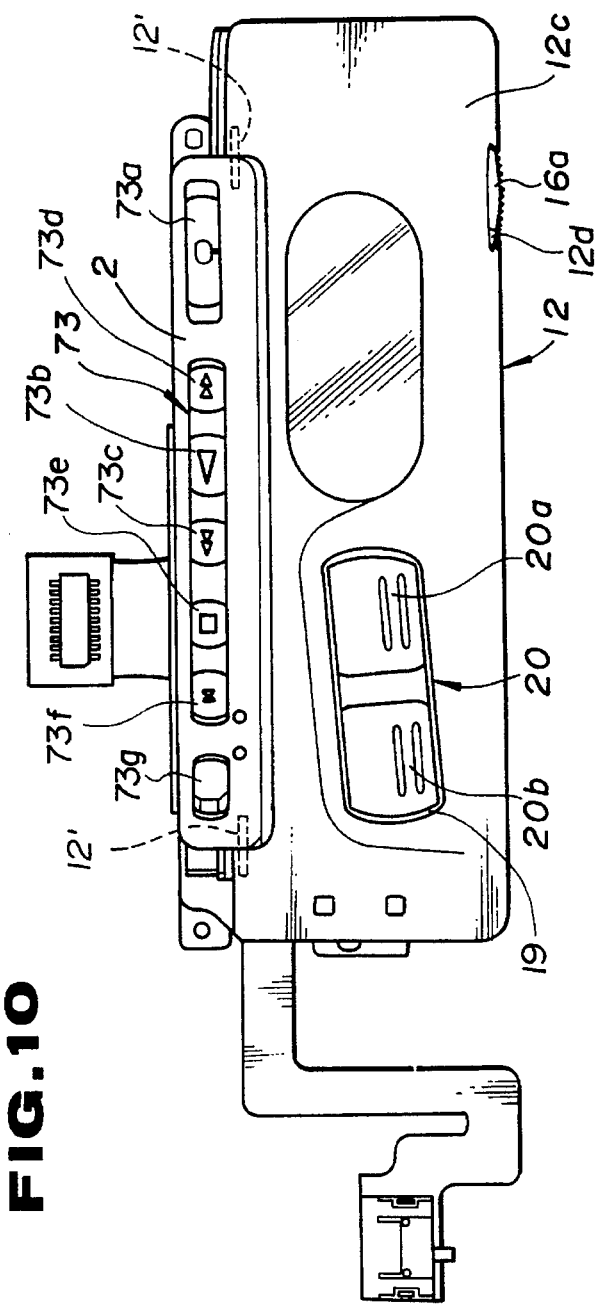
FIG. 10 is a top plan view of a lid and an adjacent portion of the top of a hollow body included in the unified video camera and VCR of FIGS. 1–9.
Figure 11:
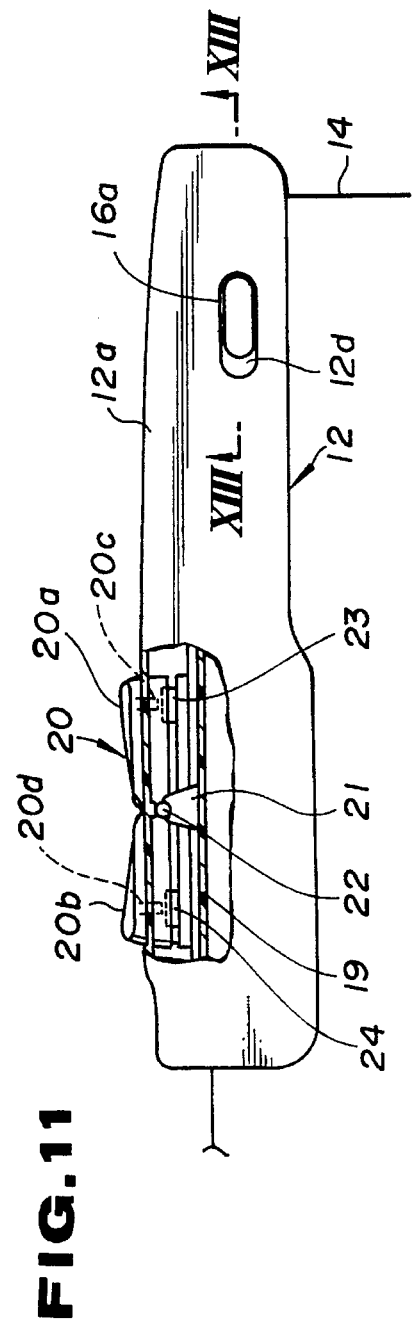
FIG. 11 is a detail side elevational view, partly broken away and in section, of the lid shown on FIG. 10.
Figure 12:
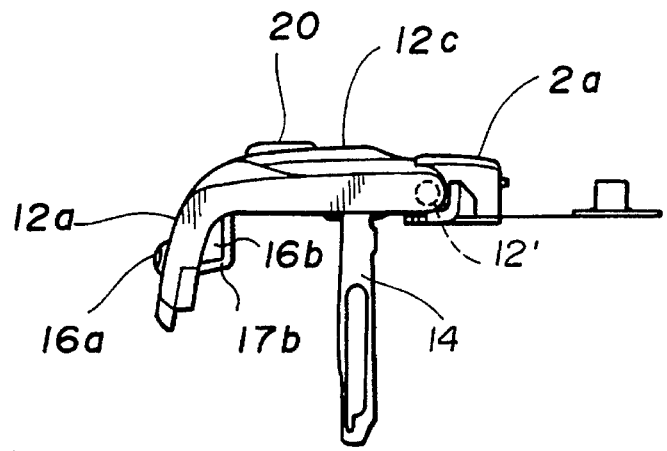
FIG. 12 is a front end elevational view of the pivoted lid of FIGS. 10 and 11.

The various components of the unified compact video camera and VCR 1 according to an embodiment of this invention will now be described in further detail. As shown on FIG. 10, the lid 12 is mounted on the body 2 for pivotal movement about an axis defined by aligned pins 12' which are disposed adjacent the top of the body 2 having the switch array 73 thereon so as to be near the median plane 2a (FIG. 4). A slotted link 14 depends from the lid 12 (FIGS. 11 and 12) and is engageable with a pin (not shown) within the body 2 for limiting the pivoting movements of the lid 12 between a closed position shown in full lines on FIG. 7 and an open position which is approximately at right angles to the closed position and is shown in dot-dash lines on FIG. 7. In such opened position, the lid 12 leaves the opening 11 substantially unobstructed for easy access to the cassette compartment holder assembly 5 so that a video tape cassette 10 can be easily manually inserted, or removed from such assembly 5. The lid 12 is shown to have a downwardly angled edge portion 12a extending along the margin of the lid remote from the pivot pins 12' (FIG. 12). A locking mechanism 15 is provided for holding the lid 12 in its closed position and is shown to include a locking slide 16 disposed against the inner surface of the angled edge portion 12a of the lid and having an outwardly projecting button 16a slidable along an elongated slot 12d formed in the edge portion 12a of the lid adjacent the forward end thereof (FIGS. 5 and 11). A pair of spaced apart guide eyes 17a and 17b are formed on the inner surface of the lid 12 and slidably receive an elongated pin 16c extending in one direction from the slide 16 and the shank of a locking claw 16b extending in the opposite direction from the slide 16. A coil spring 18 is provided on the extension 16c between the eye 17a and the adjacent end portion of the slide 16 for urging the latter toward the right, as viewed on FIG. 13, and thereby causing the locking claw 16b to engage in a recess or keeper 2b formed in a surface of the body 2 constituting the adjacent end of the opening 11. When it is desired to release the locking mechanism 15, the button 16a thereof is manually displaced in the direction of the arrow 15a on FIG. 13 against the force of the spring 18 so as to withdraw the locking claw 16b from the keeper 2b, and thereby to permit the lid 12 to be angularly displaced or raised to its opened position.

Figure 13:
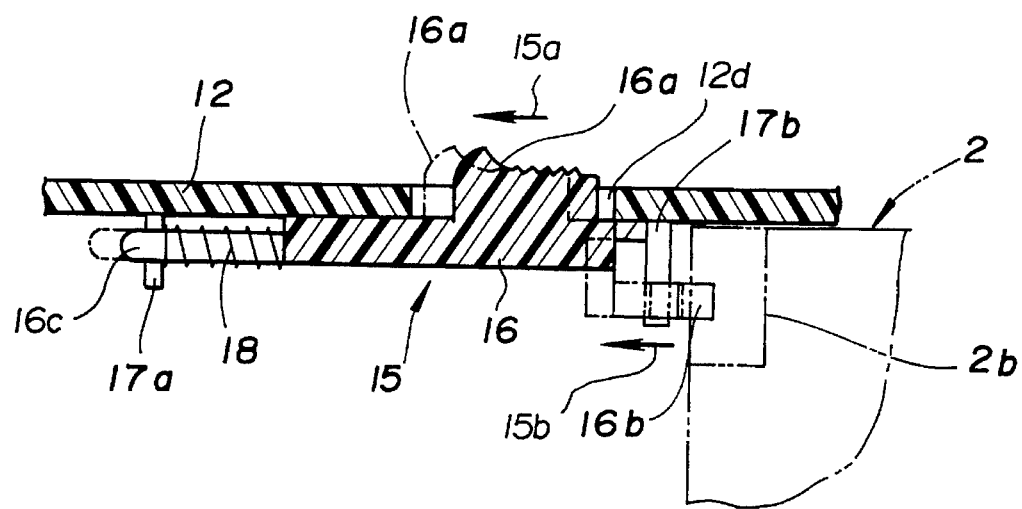
FIG. 13 is an enlarged, fragmentary sectional view taken along the line XIII—XIII on FIG. 11.

The locking claw 16b is preferably formed with a tapered surface, so that, when a pressure is applied downwardly to the upper surface 12c of the lid 12 situated in its opened position for swinging the lid toward its closed position, the tapered surface of the locking claw 16b rides against an edge of the body 2 at the forward end of the opening 11 so as to shift the slide 16 in the direction of the arrow 15b on FIG. 13 until the lid 12 attains its closed position at which the locking claw 16b is free to again engage in the keeper 2b under the influence of the spring 18. Thus, the locking mechanism 15 is returned to its engaged or locking condition.

As generally shown on FIG. 3, the camera lens assembly 6 includes a zoom mechanism 100 for achieving its power zooming capability, and such zoom mechanism 100 is controllable in response to manual actuation of a zoom control switch assembly 20 which, in accordance with the present invention, is mounted on the lid 12. More specifically, and as shown in detail on FIGS. 10 and 11, the zoom control switch assembly 20 includes a "zoom-in" button portion 20a and a "zoom-out" button portion 20b formed integrally at an obtuse angle relative to each other and being rockable about a central pivot axis in a recess 19 formed in the upper surface 12c of the lid 12 adjacent the back end portion of the latter. The axis of pivoting of the buttons 20a and 20b may be defined by a pivot pin 22 supported on bases 21 within the recess 19 (FIG. 11). The buttons 20a and 20b have depending projections 20c and 20d which, in response to depressing of the button 20a or the button 20b, are operative to actuate "zoom-in" and "zoom-out" switches 23 and 24, respectively. Such actuation of the switch 23 causes the zoom mechanism 100 to shift the lens cylinder 8 carrying the objective lens 7 in the forward direction for achieving "zooming-in". On the other hand, actuation of the switch 24 in response to depressing of the button 20b, causes operation of the zoom mechanism 100 in the direction to shift the lens cylinder 8 in the backward direction for achieving "zooming-out".

The VCR unit 3 is shown on FIGS. 3 and 5 to have a mechanical chassis 30 substantially coinciding with the median plane 2a within the hollow body 2, and on which there are mounted a rotary head drum assembly 33, a vertically movable compartment 10 of the cassette compartment holder assembly 5 which carries a pair of rotary tape reel bases 31 and a cassette loading mechanism (not shown). As earlier noted, the cassette compartment holder assembly 5 has an outer wall portion 5a which, in the loading position of the cassette compartment holder assembly 5 (FIGS. 5 and 18A), forms the upper portion of the side wall of the body 2 adjacent the grip strap assembly 13. The wall 5a is provided with a transparent window 35 (FIG. 5) through which one of the tape reel bases 31 can be observed for determining whether or not a cassette C is installed in the VCR unit 3.

An eject button 36 is mounted at the top of the body 2 near the back end of the latter (FIG. 4) so as to be covered by the lid 12 when the latter is in its closed position. Thus, the eject button 36 is accessible for manual actuation only after the lid 12 has been raised to its opened position, whereupon actuation of the eject button 36 can be effective to vertically upward displace the compartment 10 of the cassette compartment holder assembly 5 from its loading position (FIG. 19) to a raised position 10' corresponding to an intermediate position of the cassette compartment holder assembly indicated in dot-dash lines at 5' on FIG. 7, and in which a cassette holder 32 of the assembly 5' projects upwardly out of the body 2. After the compartment 10 has been shifted vertically upward to its raised position indicated at 10' on FIG. 7 and also shown on FIG. 18C, and 20A, the cassette holder 32 and the tape cassette C therein are accessible and the holder 32 with a cassette therein can be manually pulled outwardly to the position indicated at 32' on FIGS. 7, 18D and 20B and which corresponds to the eject position 5" of the cassette compartment holder assembly. In such eject position 5", the tape cassette C can be readily removed from or inserted into the holder 32". For returning the cassette compartment holder assembly 5 to its loading position either with or without a tape cassette C in the holder 32, the wall portion 5a is simply pushed laterally inward, as on FIG. 18E, for returning the assembly to its intermediate position indicated at 5' on FIGS. 18C and 20A, whereupon the compartment 10 of the cassette compartment holder assembly 5 is automatically returned downwardly to its loading position by means of the cassette loading mechanism as hereinafter described in detail with reference to FIGS. 19, 20A and 20B.

Figure 19:
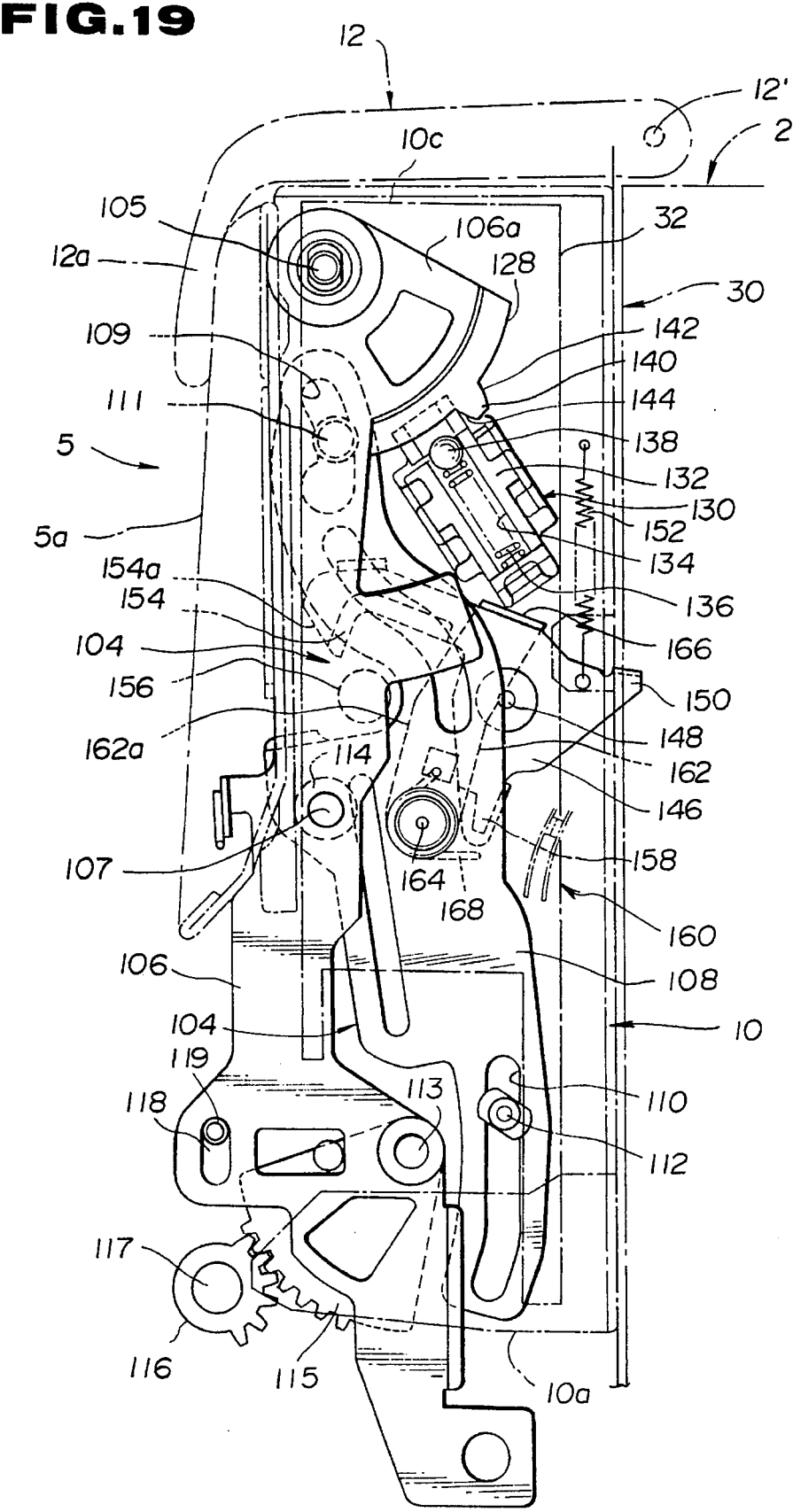
FIG. 19 is an enlarged, detail elevational view of a mounting structure for the cassette holder compartment included in the illustrated embodiment of the invention, and which is shown for disposing the cassette holder compartment in its loading position.
Figure 20A:
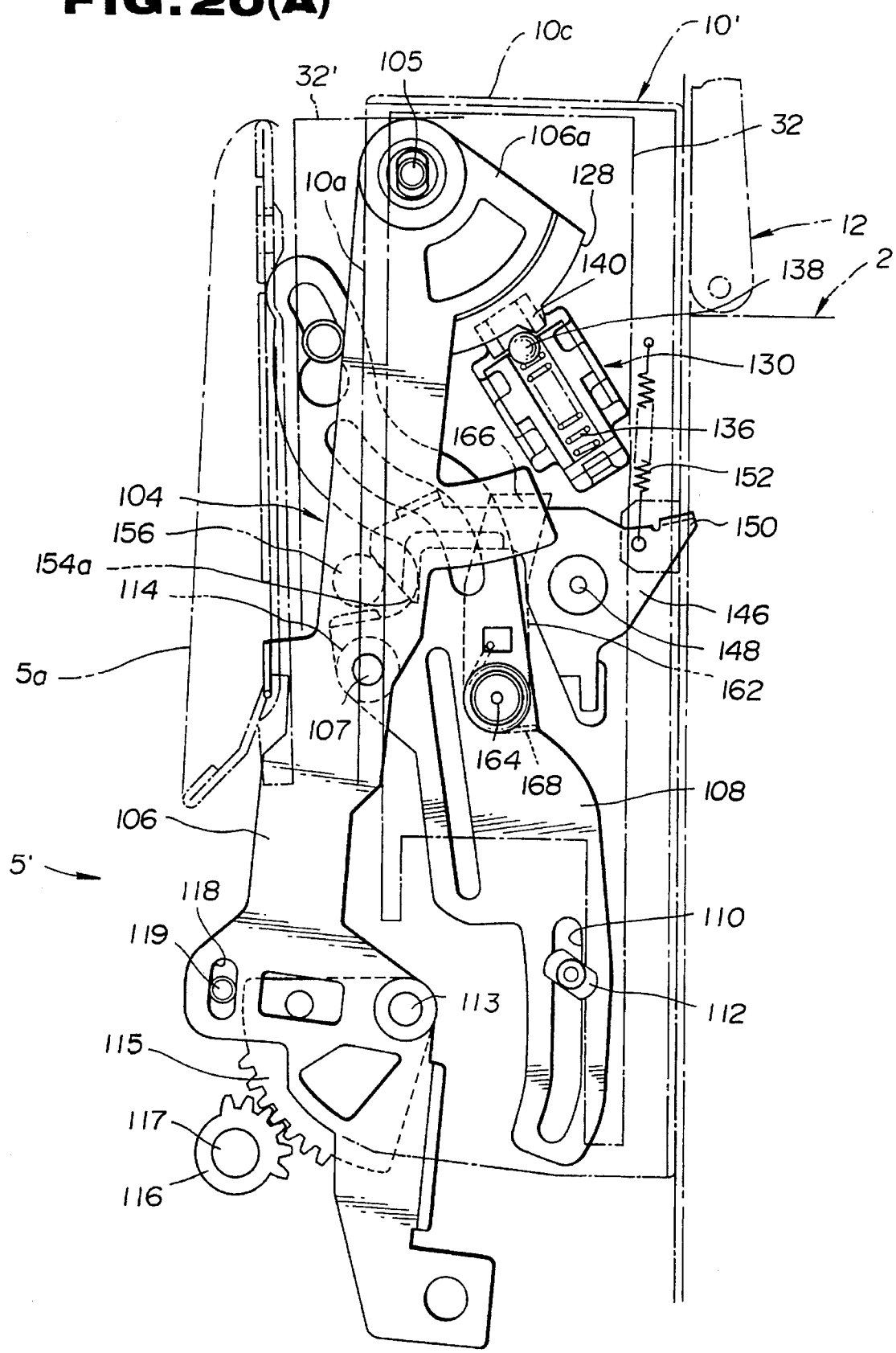
FIGS. 20A and 20B are views similar to that of FIG. 19, but showing the mounting structure disposed for positioning the cassette holder compartment in an intermediate position and in an eject position, respectively.
Figure 20B:
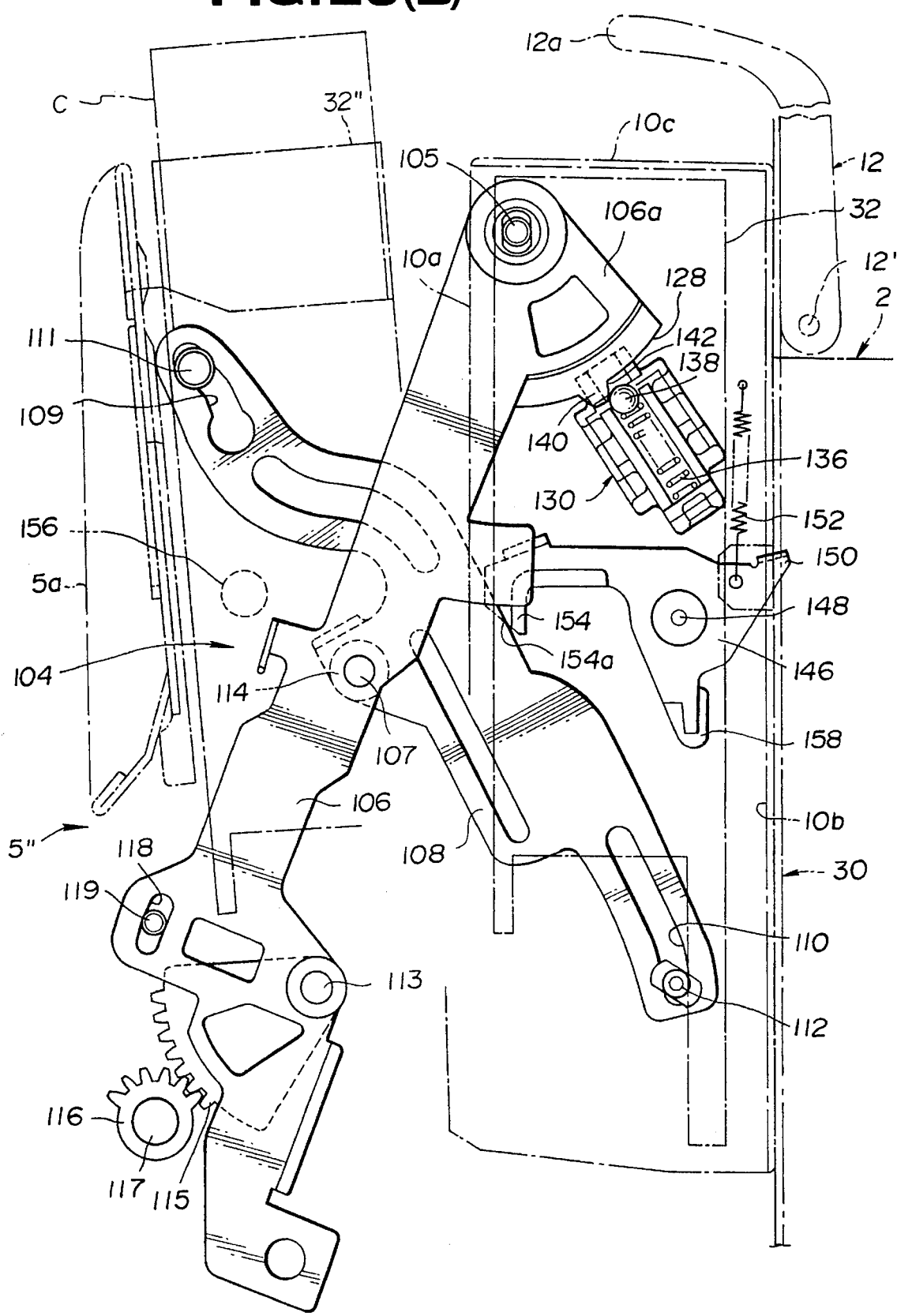

In the illustrated embodiment of the invention, the cassette holder 32 is maintained approximately parallel with the chassis 30 and with the base 10b of compartment 10 while being moved between the fully open or eject position 32" on FIG. 20B and the fully closed or loading position 32 on FIG. 19 through the intermediate position 32' on FIG. 20A. For the purpose of achieving such movement, each of the front and back ends of the cassette holder 32 is mounted on the compartment 10 by means of a respective link assembly 104. Each of the link assemblies 104 includes an elongated actuating lever 106 pivotally connected at its upper end to a pivot pin 105 carried by a vertical flange 10a directed outwardly from the base 10b of the compartment 10 near the adjacent forward or back end of the cassette holder 32. As particularly shown on FIG. 20B, each pivot pin 105 is positioned near the outer edge of the respective flange 10a adjacent an upper flange 10c of the compartment 10. Each link assembly 104 further includes a connecting lever 108 which is pivotally connected, intermediate its ends, to a pivot pin 107 carried by a mid portion of the respective actuating lever 106.

The upper and lower end portions of each connecting lever 108 are formed with respective elongated slots 109 and 110 extending therealong. Each slot 109 slidably receives a connecting pin 111 which extends from an upper portion of the adjacent end of the holder 32, while each slot 110 slidably receives a pivot pin 112 which is carried by the lower portion of the adjacent flange 10a of the compartment 10 near to the base 10b thereof. The lower end of the actuating lever 106 of each link assembly 104 is pivotally connected, as by a pivot 113, to a lower portion of the cassette holder 32 at the adjacent side of the latter. A torsion spring 114 is arranged around the pivot 107 connecting the levers 106 and 108 and acts, at its opposite ends, against the levers 106 and 108 in the directions for urging the lever 108 to turn in the counter-clockwise direction, as viewed on FIGS. 19, 20A and 20B, relative to the respective lever 106. Thus, the levers 106 and 108 of each link assembly 104 are urged relative to each other by the respective torsion spring 114 to the angularly displaced positions shown on FIG. 20B. In order to synchronize the movements of the link assemblies 104 at the front and back ends of the compartment 10, each lever 106 has a gear segment 115 turnable therewith about the respective pivot 113 relative to the lower portion of the cassette holder 32 and meshing with a pinion 116 which is secured on an adjacent end portion of a shaft 117 suitably rotatably mounted in respect to the holder 32. Further, the angular movements of the levers 106 of the link assemblies 104 relative to the holder 32 are equally limited by a slot 118 formed in the lower end portion of each lever 106 and receiving a pin 119 which projects fixedly from the adjacent end of the holder 32. As shown on FIGS. 19 and 20B, the angular positions of the cassette holder 32 relative to the levers 106 of the link assemblies 104 are limited, in the loading position (FIG. 19) and in the eject position (FIG. 20B) of the cassette compartment holer assembly 5 by the engagement of each pin 119 with the upper and lower ends, respectively, of the respective slot 118.

As also shown on FIGS. 19, 20A and 20B, the upper end of each actuating lever 106 is formed with a fan-shaped portion 106a having an arcuate cam face 128 adapted to cooperate with a detent assembly 130. The detent assembly 130 is shown to include a housing 132 suitably fixed to the adjacent side flange 10a of the compartment 10 and defining an axial bore 134 which opens, at one end, toward the cam face 128. A compression spring 136 is disposed within the bore 134 and resiliently urges a detent ball 138 to project from the open end of the bore 134 and into resilient contact with the cam face 128. A radial projection 140 with slopping or tapered sides 142 and 144 extends from a midportion of the cam face 128 so that engagement of the detent ball 138 against the sloping side 144 of the projection 140, as on FIG. 20A, defines the angular position of the respective actuating lever 106 for the intermediate position of the cassette compartment holder assembly 5'. On the other hand, engagement of the detent ball 138 with the other tapered side 142 of the projection 140, as on FIG. 20B, serves to stabilize the cassette compartment holder assembly in its eject position indicated at 5".

A locking lever 146 is mounted on one of the side flanges 10a of the compartment 10 for pivoting about a pin 148. A tension spring 152 is connected, at one end, to an end portion 150 of the locking lever, and the other end of the tension spring 152 is suitably anchored to the adjacent side flange 10a so that the spring 152 urges the locking lever 146 to turn in the counter-clockwise direction, as viewed on FIGS. 19, 20A and 20B, to its locked position shown on FIGS. 20A and 20B. At the end of the locking lever 146 remote from the end portion 150, there is formed a locking hook 154 which is engageable, in the loading position of the cassette compartment holder assembly 5 (FIG. 19) with a locking roller 156 extending from an adjacent end of the cassette holder 32. The locking hook 154 is formed with an oblique edge 154a so that, as the cassette holder 32 is moved laterally into the compartment 10 from the position shown on FIG. 20B through the position of FIG. 20A to the position of FIG. 19, the locking roller 156 on the cassette holder 32 rides against the oblique edge 154a of the locking hook and thereby angularly displaces the locking lever 146 against the force of the spring 152, that is, in the clockwise direction as viewed on the drawings. Of course, when the locking roller 156 attains the position shown on FIG. 19, spring 152 can then return locking lever 146 from its there-illustrated released position to the locking position in which the hook 154 engages the locking roller 156 at the outer side of the latter, that is, at the side facing away from the chassis 30.

The locking lever 146 is further shown to have a switch actuating element 158 extending therefrom for operation of a limit switch 160 mounted on the adjacent flange 10a of the compartment 10. The switch 160 is normally biased to its opened condition and is changed-over to its closed condition in response to actuation by the element 158 on the locking lever 146 when the latter moves to its locking position for retaining the cassette compartment holder assembly 5 at its loading position. Thus, the limit switch 160 serves to detect the arrival of the cassette holder 32 at its tape loading position shown on FIG. 19, and the consequent closing of the switch 160 enables a tape loading mechanism (not shown) to operate for withdrawing tape from a cassette in the holder 32 and for wrapping the tape on the rotary head drum 33.

In order to stabilize the position of the cassette holder 32 when the cassette compartment holder assembly 5 is in its loading position, a bearing arm 162 is mounted adjacent the locking lever 146 on a pivot pin 164 carried by the adjacent flange 10a of the compartment 10. The arm 162 is angularly urged about the pivot pin 164 in the counter-clockwise direction, as viewed on FIGS. 19 and 20A, by means of a torsion spring 168. A flange 166 is provided at the free end of the arm 162 and is engageable with an edge of the locking lever 146 so that the position of the latter determines the limit of the angular movement of the arm 162 by the torsion spring 168. Thus, when the locking roller 156 rides over the oblique edge 154a of the locking hook 154 during movement of the cassette holder 32 to its loading position, the clockwise angular displacement of the locking lever 146 to the position shown on FIG. 19 is accompanied by a corresponding angular displacement of the bearing arm 162 so as to move its side edge 162a away from the locking roller 156 and thereby avoid interference with the final movement of the cassette holder 32 to its loading position. However, when the cassette holder 32 attains its loading position so that the locking roller 156 has then moved past the locking hook 154, tension spring 152 can return locking lever 146 in the counter-clockwise direction to its locking position and, in response thereto, bearing arm 162 can be similarly angularly displaced by the torsion spring 168 for bringing its side edge 162a against the locking roller 156. Accordingly, in the loading position of the cassette holder 32, the locking roller 156 is securely embraced at its opposite sides by the locking hook 154 of the locking lever 146 and the side edge 162a of the biased bearing arm 162 for stabilizing the cassette holder 32.

The operations of the cassette compartment holder assembly 5 will now be described assuming that, to begin with, the assembly 5 is in its loading position (FIGS. 18A and 19) with the lid 12 closed, and with a tape cassette being operatively positioned within the holder 32 and the tape loading mechanism (not shown) of the VCR unit having been operated to withdraw tape from the cassette housing and to wrap the same about the rotary head drum 33. When it is desired to remove the cassette from the body 2, the lock mechanism 15 of the lid 12 is initially released by displacing its button 16a in the direction of the arrow 170 on FIG. 18A, so that the lid 12 is then free to be raised to its opened position, as indicated by the arrow 171.

Figure 18B:
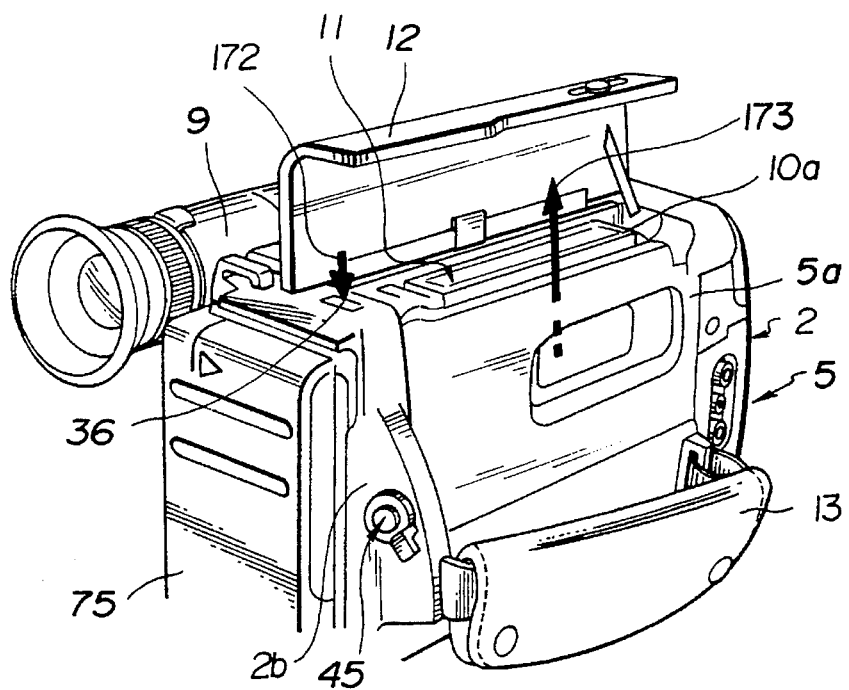

After the lid 12 is opened, as on FIG. 18B, the eject button 36, which is thereby exposed or made accessible, is actuated as indicated by the arrow 172. In response to such actuation of the eject button 36, the tape loading mechanism (not shown) of the VCR unit 3 is made operative to unload the tape, that is, to unwrap the tape from about the rotary head drum and to retract the unwrapped tape into the cassette housing, whereupon, upward movement of the compartment 10 relative to the chassis 30 is suitably initiated, as indicated by the arrow 173 on FIG. 18B. In the course of such upward movement of the compartment 10 by the tape loading mechanism, a component of the latter acts downwardly on the end portion 150 of the locking lever 146 for angularly displacing the latter to its released position shown on FIG. 19 and in which the locking hook 154 is disengaged from the locking roller 156. Upon disengagement of the locking hook 154 from the roller 156, the resilient force of the torsion spring 114 associated with each of the link assemblies 104 becomes effective to angularly displace the levers 106 and 108 relative to each other from the positions shown on FIG. 19 toward the positions shown on FIG. 20B. However, in the course of such relative angular displacements of the levers 106 and 108 by the respective torsion springs 114, the side 144 of projection 140 extending from the cam face 128 comes into engagement with the detent ball 138, as on FIG. 20A, and thereby arrests any further angular movement of the respective actuating lever 106 about the pivot 105. Therefore, when the compartment 10 is raised to the position shown on FIG. 20A, at which it extends above the top of the body 2, the cassette holder indicated at 32' and the outer wall portion 5a are displaced to some extent outwardly relative to the compartment 10, that is, the cassette compartment holder assembly is then in its intermediate position indicated at 5' on FIG. 18C and FIG. 20A.

Figure 18C:
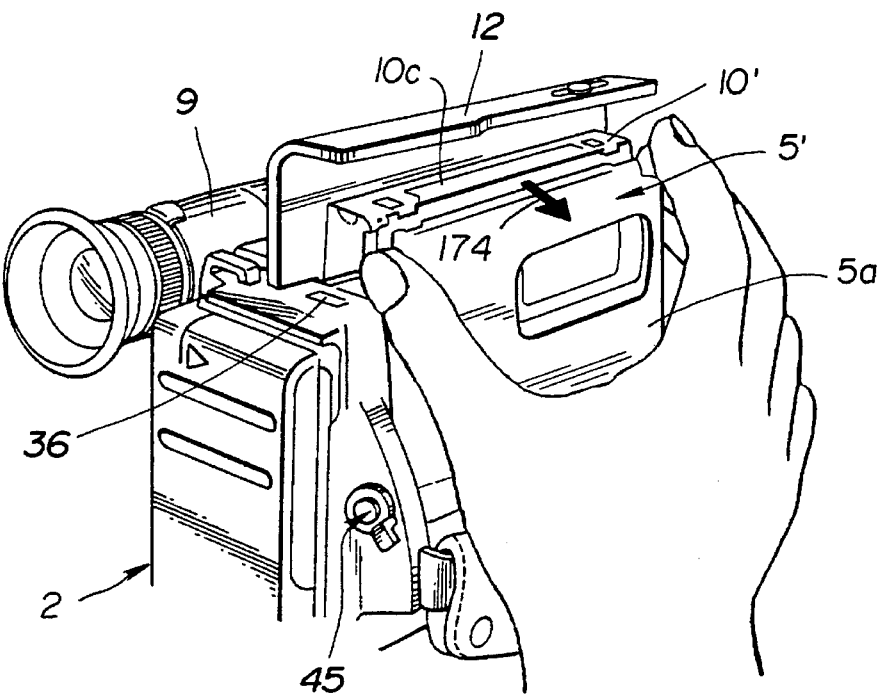
Figure 18D:
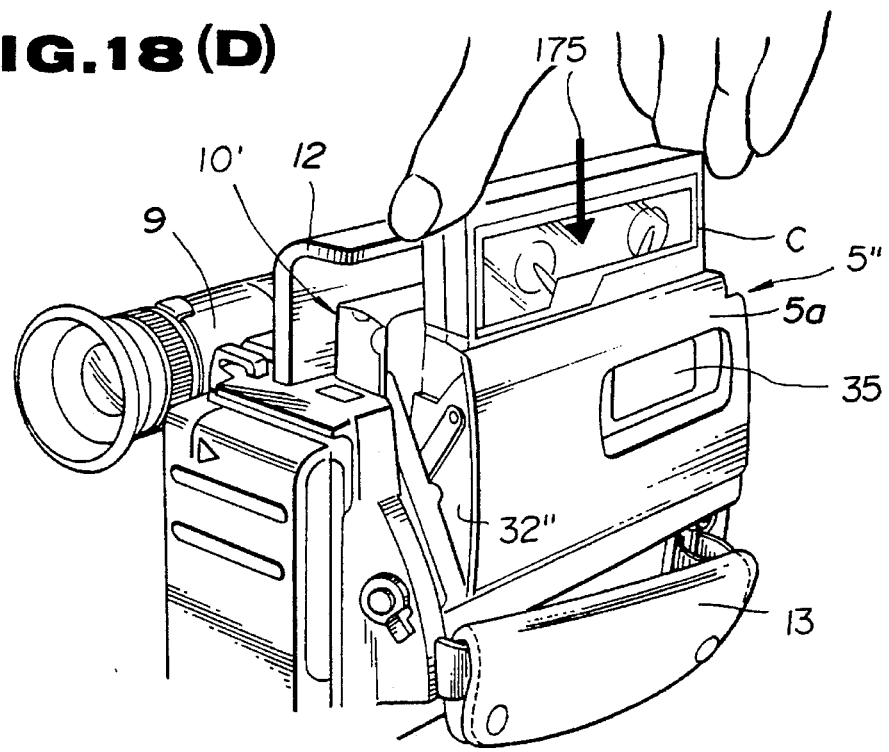
Figure 18E:
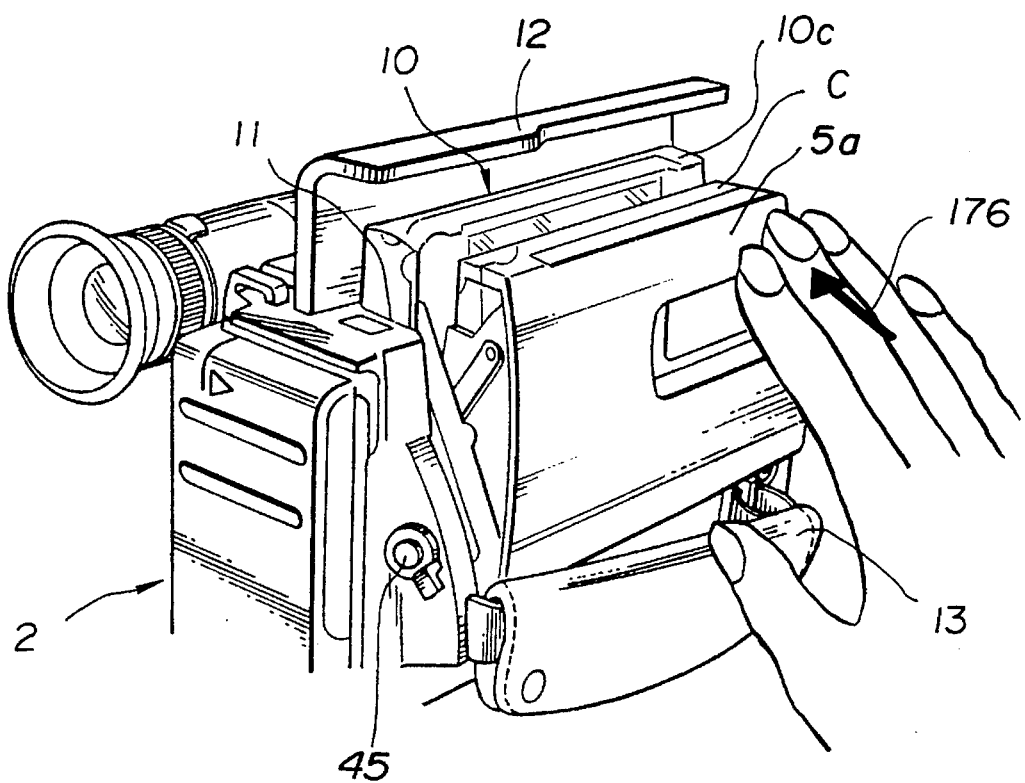

In such intermediate position of the cassette compartment holder assembly 5', the outer wall portion 5a which then projects upwardly and outwardly relative to the body 2 can be readily grasped and pulled outwardly in the direction of the arrow 174 on FIG. 18C. Such outward pulling of the wall 5a, and hence of the cassette holder 32 connected therewith, is effective to drive the projection 140 on the cam surface 128 past the detent ball 138 so that the relative angular movements of the levers 106 and 108 to the positions shown on FIG. 20B can be completed under the influence of the outwardly directed pull exerted on the wall portion 5a and the forces of the torsion springs 114. Thus, the cassette holder is moved to its eject position indicated at 32" on FIG. 20B and at which it is stabilized by the engagement of the detent ball 138 against the side 142 of the projection 140. It will be apparent that, in such eject position of the cassette holder 32", the open top of the latter is spaced laterally outward from the top flange 10c of the compartment 10 so that the latter does not interfere with the removal or insertion of a cassette in the cassette holder 32" through the open top of the latter. For example, with the cassette compartment holder assembly in its eject position indicated at 5" on FIG. 18D, and assuming that the cassette holder 32" has been previously emptied, a new cassette C can be readily inserted downwardly in the direction of the arrow 175 into the cassette holder 32". After a cassette C has been thus inserted in the cassette holder, the operator pushes inwardly against the wall portion 5a, as indicated by the arrow 176 on FIG. 18E and, in response to such manually applied force, the levers 106 and 108 are angularly displaced relative to each other against the forces of the torsion springs 114 from the positions shown on FIG. 20B to the positions shown on FIG. 19. In the course of such relative angular displacements of the levers 106 and 108, the projection 140 on each cam surface 128 is forcibly moved past the ball detent 138, and the locking roller 156 is moved across the oblique edge 154a of the locking claw 154 and is finally embraced between the locking claw 154 and the bearing arm 162 for stabilizing the cassette holder 32 relative to the compartment 10 in the position shown on FIG. 19. Further, upon the engagement of the locking claw 154 of the locking lever 146 with the locking roller 156, the switch actuating element 158 extending from the lever 146 actuates the limit switch 160 and thereby enables the tape loading mechanism for moving the compartment 10 downwardly and restoring the cassette compartment holder assembly 5 to its loading position at which the tape loading mechanism withdraws tape from the cassette and wraps the same on the rotary head drum.

Figure 17:
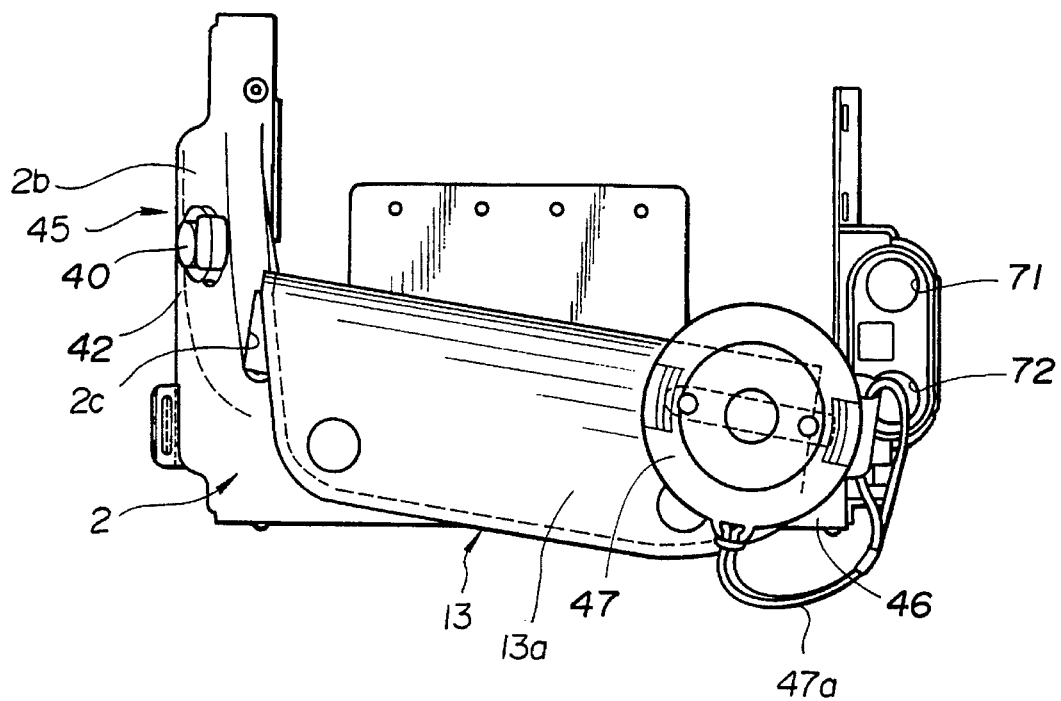
FIG. 17 is a side elevational view of a portion of the body included in the illustrated embodiment of the invention, and which particularly shows the structures on such portion of the body for mounting a grip strap and a lens cap.

As shown particularly on FIGS. 5 and 17, at the side of the body 2 which accommodates the VCR unit 3, the rear portion of the body 2 is formed with an outwardly directed ear-like member 2b which, near its lower margin, is formed with a slot 2c through which a strap 46 of the grip strap assembly 13 is threaded. The forward portion of the strap 46 is threaded through a slotted ear 2d (FIG. 7) projecting laterally from the body 2 below the wall portion 5a adjacent the forward end of the latter. A cushioning member or pad 13a is suitably secured around the strap 46 which is spaced laterally outward from the underlying suitably contoured surface 2e of the body 2 by the ears 2b and 2d to which the ends of the strap 46 are secured. Thus, as shown particularly on FIG. 9, a gap 13b is defined between the cushioning member 13a of the strap assembly 13 and the underlying contoured surface 2e of the body 2 for comfortably accommodating the operator's hand H as shown on FIG. 2.

Figure 8:
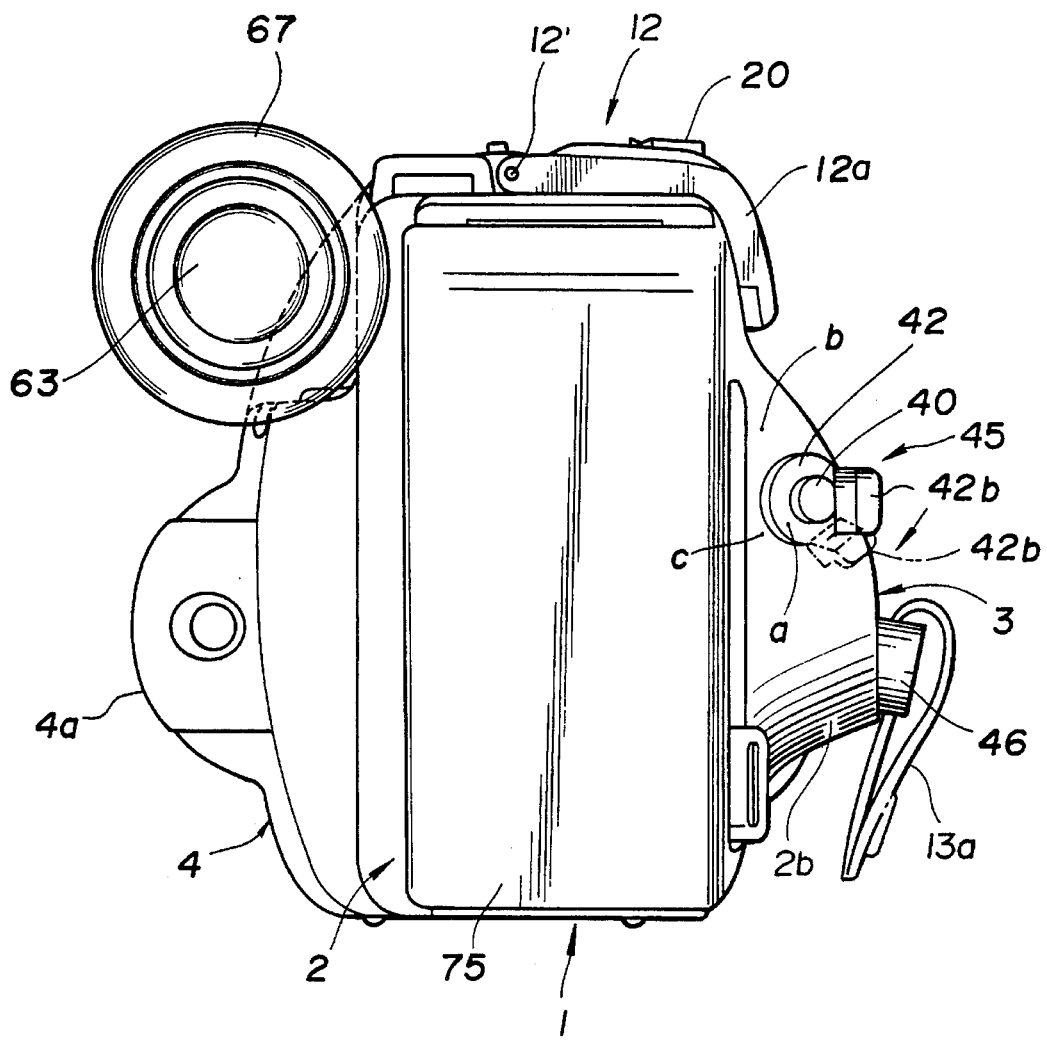
FIG. 8 is a rear end elevational view of the unified video camera and VCR of FIGS. 1–7.
Figure 14:
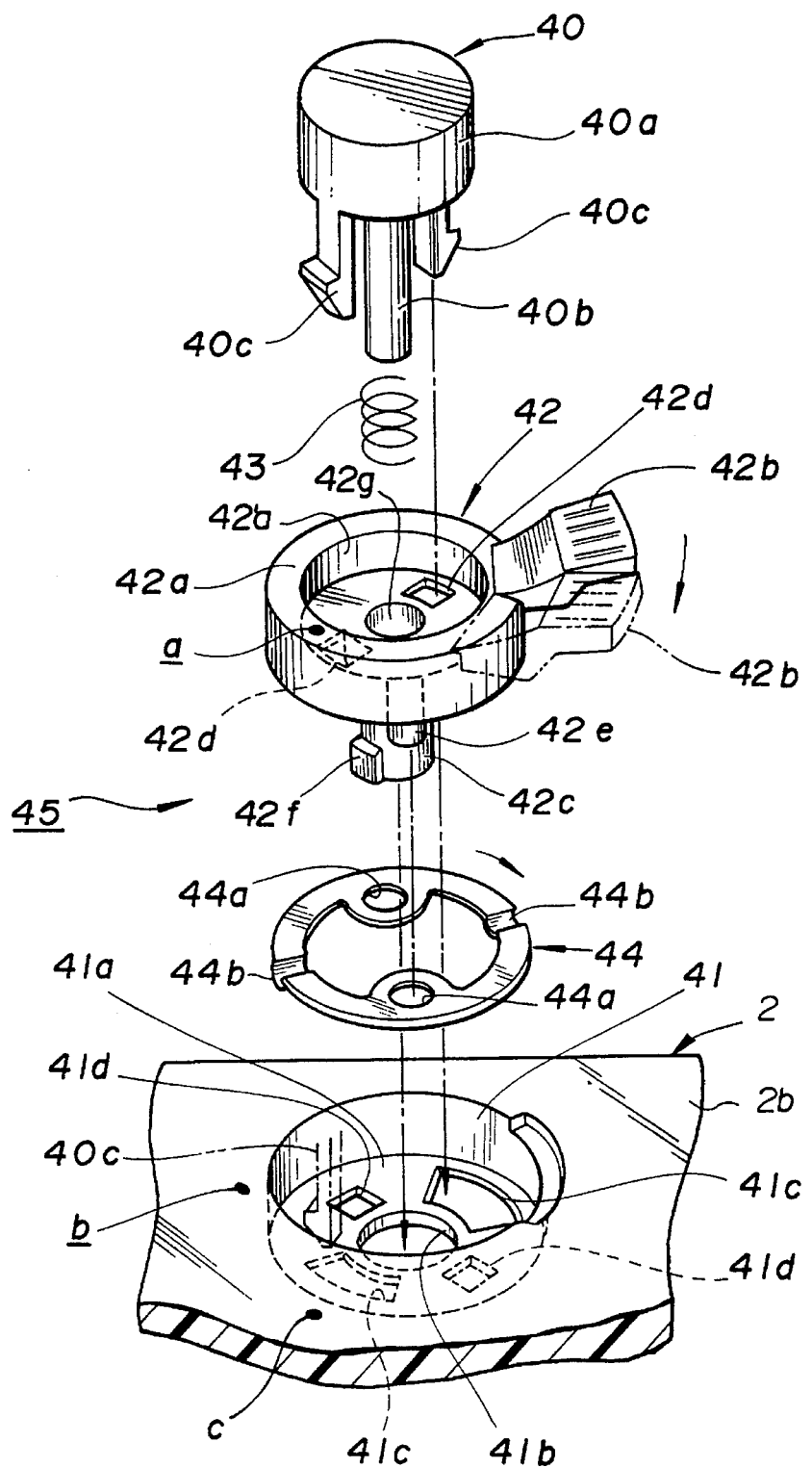
FIG. 14 is an enlarged, exploded perspective view of a start/stop button assembly included in the illustrated embodiment of the invention.

As shown particularly on FIGS. 5 and 8, a start/stop button assembly 45 is provided on the generally rearwardly facing surface of the ear-like member 2b at the back end portion of the body 2 so as to be readily accessible to the thumb of the operator's hand which extends upwardly between the strap assembly 13 and the underlying surface of the body 2 for cradling the latter. As shown on FIG. 14, for the purpose of accommodating the start/stop button assembly 45, the ear-like extension 2b is formed with a circular recess 41 dimensioned to rotatably receive a rotary member 42. A start/stop button 40 is molded of a synthetic resin so as to have a cylindrical body 40a, a stem 40b depending centrally from the body 40a and a pair of latching claws 40c which extend parallel to the stem 40b at diametrically opposed locations on the cylindrical body 40a. The rotary member 42 is molded with a circular body 42a defining a recess 42'a dimensioned to receive the body 40a of button 40. The body 42a is further formed with a radial extension 42b, and an axially directed central tubular extension 42c defining a central bore 42g which opens upwardly into the recess 42'a. The tubular extension 42c has a latching projection 42f directed radially from its lower end. Diametrically opposed openings 42d are formed in the bottom of the recess 42'a of the body 42a for receiving the latching claws 41c, and the rotary member 42 is further formed with a pair of axially directed pins 42e extending downwardly from the bottom surface of the body 42a at diametrically opposed locations. In assembling the start/stop button 40 and the rotary member 42, the stem 40b is extended through a helical compression spring 43 and then inserted downwardly in the bore 42g while the latching claws 40c are directed downwardly through the openings 42d. It will be appreciated that the spring 43 urges the button body 40a upwardly to a raised position within the recess 42'a at which the claws 40c engage the under-surface of the rotary body 42a.

The tubular extension 42c with the latching projection 42f extends through a central opening 41b formed in the bottom 41a of the recess 41. A first pair of diametrically opposed, arcuate slots 41c are formed in the bottom 41a of recess 41 between the central opening 41b and the outer periphery of the recess 41. Another pair of rectangular openings 41d which are also diametrically opposed are formed in the bottom 41a of recess 41 approximately midway between the arcuate slots 41c. A ring 44 of spring metal is situated around the tubular extension 42c between the bottom of the body 42a and the bottom 41a of the recess 41 and has a pair of diametrically opposed circular openings 44a dimensioned for the passage of the pins 42e therethrough so that the ring 44 is turnable with the rotary member 42. The ring 44 of spring metal is further formed with a pair of diametrically opposed, downwardly offset projections or detents 44b positioned along the ring 44 approximately midway between the openings 44a, and being engageable in the openings 41d formed in the bottom 41a of the recess 41.

The pins 42e and the openings 42d of the rotary member 42 are positioned relative to each other so that, when the pins 42e extend through the openings 44a of the ring 44 and the rotary member 42 is positioned to engage the projections 44b of the ring 44 in the openings 41d at the bottom of the recess 41, the slots 42d through which the locking claws 40c extend are rotationally offset relative to the arcuate slots 41c in the bottom of the recess 41a. Thus, the claws 40c bear against the bottom 41a of the recess 41 for blocking the downward movement of the start/stop button 40. Such rotational position of the rotary member 42 is hereinafter referred to as the "locking position", which is established by turning the rotary member 42 until a marking a thereon is in radial alignment with a marking b provided on the surface of the body 2 adjacent the recess 41.

In order to establish an unlocked or "stand-by position" of the rotary member 42, the latter is turned until the marking a thereon is radially aligned with a marking c also provided on the body 2 adjacent the recess 41. In such "stand-by position" of the rotary member 42, the openings 42d in the rotary member 42 are registered with the arcuate slots 41c in the bottom 41a of the recess 41 so that the latching claws 40c can pass downwardly through the slots 41c when the start/stop button 40 is depressed to start or stop the recording of a video signal obtained from the video camera unit 4. The starting and stopping of the operation of the video camera unit in response to the depressing of the start/stop button 40 are effected in a conventional manner. It should be noted that, when the rotary member 42 is in its "stand-by position" the radial extension 42b is disposed to function as a rest for the operator's thumb.

As shown particularly on FIG. 17, a lens cap 47 for closing the open front end of the camera lens assembly 6 and thereby protecting the lens 7 when the video camera unit 4 is not in use, may be connected to the grip strap 46 at the forward end of the latter by means of a flexible lanyard 47a or other connection.

As shown on FIG. 6, the viewfinder 9 is mounted on the body 2 for pivoting between a first orientation or position shown in full lines on FIG. 6 and in which the viewfinder 9 is accommodated substantially within a recess or depression 4b extending along the body 2 above the protrusion 4a, and an upwardly pivoted position, indicated in dot-dash lines at 9' on FIG. 6, and in which the viewfinder extends obliquely upward out of the recess 4b. The range of pivotal movement of the viewfinder 9 is desirably approximately 90°.

Figure 15:
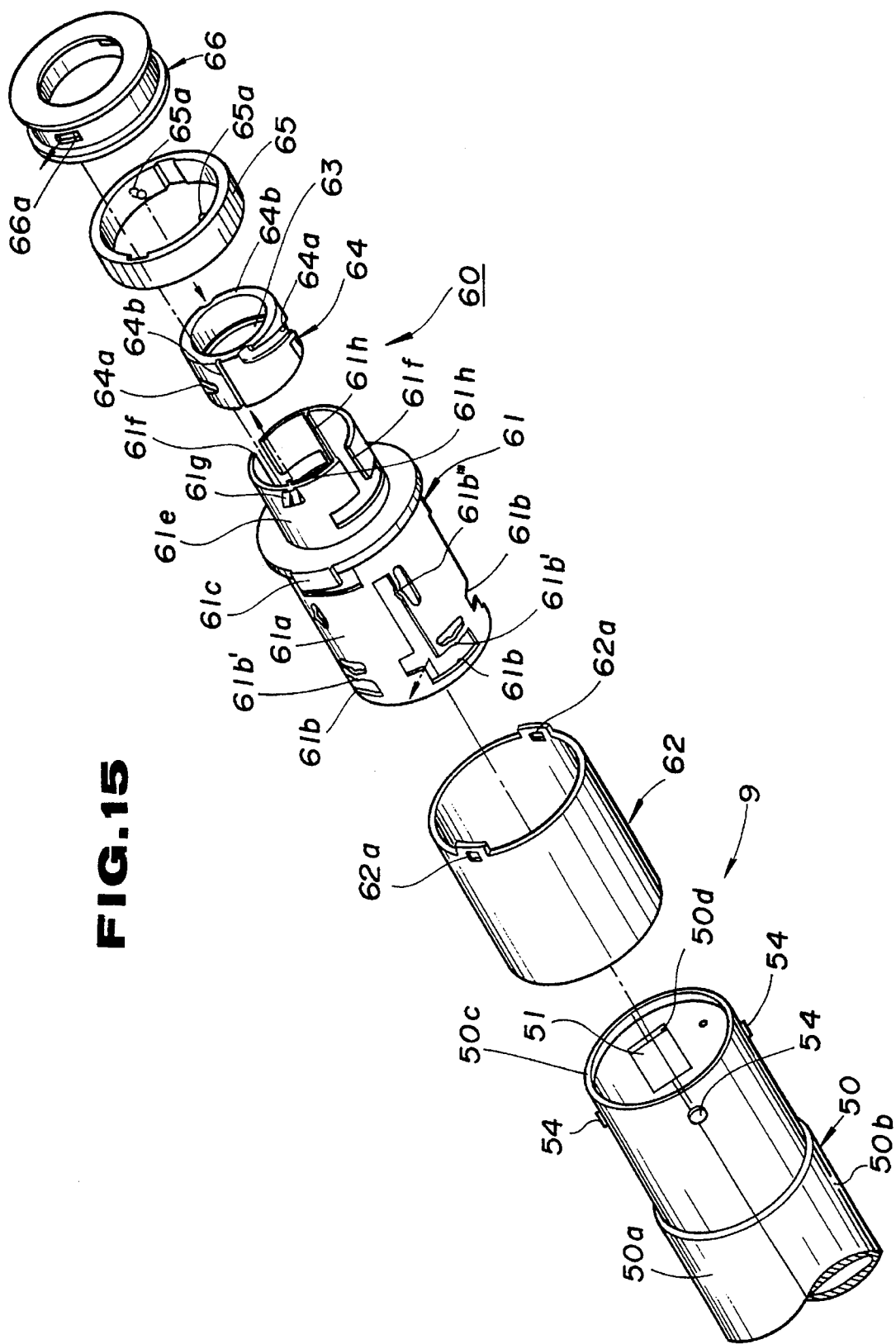
FIG. 15 is an enlarged, exploded perspective view of a viewfinder included in the illustrated embodiment of the invention.

As shown particularly on FIG. 15, the viewfinder 9 includes a viewing screen assembly 50 comprised of upper and lower, semi-cylindrical housing portions 50a and 50b which are suitably secured to each other and contain a cathode-ray tube (CRT) 51 having its screen exposed at a window 50d formed in an end wall 50c of the viewing screen assembly 50. At the end of the viewing screen assembly 50 remote from the end wall 50c, there is provided a transverse extension 52 (FIGS. 4 and 6) which is rotatably mounted within a receptacle 4c formed in the body 2 (FIG. 6) for permitting the described pivotal movement of the viewfinder 9 through approximately 90° upwardly from the nested position of the latter. The lower semi-cylindrical portion 50b of the housing of the viewing screen assembly 50 has a recess 50e (FIG. 6) therein for receiving a latching projection 4e projecting from the bottom surface of the recess 4b. Engagement of the latching projection 4e in the recess 50e is effective to prevent inadvertent movement of the viewfinder 9 from its rest position. An edit switch 53 which is to be operated in an edit mode of the apparatus also extends from the body 2 within the recess 4b so as to be hidden from view and protected by the viewfinder 9 when the latter is within its rest position shown in full lines on FIG. 6.

Referring again to FIG. 15, it will be seen that the viewfinder 9 further comprises an eye piece assembly 60 which generally includes a cylindrical holder 61, an outer housing 62, a lens 63 within a lens holder 64, a lens adjustment ring 65 and an eye cap holder 66.

Figure 16:
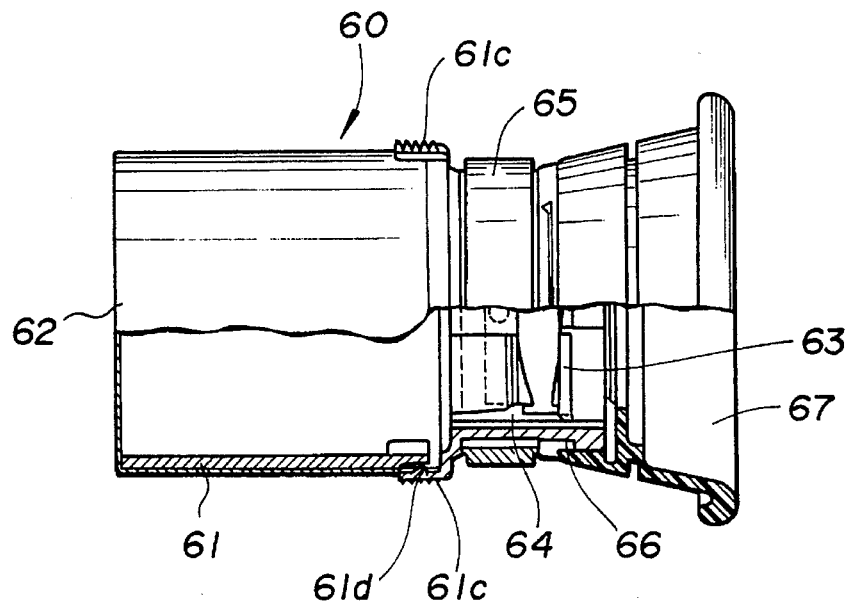
FIG. 16 is an enlarged side elevational view, partially in section, of an eye piece included in the telescopic viewfinder of FIG. 15.

The holder 61 is shown to include a relatively larger diameter cylindrical section 61a and a smaller diameter cylindrical section 61e. The large diameter section 61a is dimensioned to be slidable on the housing of viewing screen assembly 50 and has 4 substantially L-shaped guide slots 61b formed therein at regular intervals around the cylindrical section 61a. These guide slots 61b slidably receive respective connecting pins 54 which project radially outward from the outer surface of the viewing screen assembly 50 for positioning the eye piece assembly 60 relative thereto. A pair of diametrically opposed strips 61c formed with inwardly projections 61d (FIG. 16) are offset radially outward from the large diameter section 61a adjacent the end of the latter to which the small diameter section 61e is connected. Thus, the engaging strips 61c are spaced radially outward from the outer surface of the large diameter section 61a so that the inwardly directed projections 61d on the strips 61c are engageable in cutouts 62a formed in an edge portion of the cylindrical cover 62 when the latter extends axially over the large diameter section 61a of the finder holder 61 (FIG. 16).

The lens holder 64 carrying the lens 63 is diametrically dimensioned so as to be rotatable within the smaller diameter section 61e of the holder 61. The lens adjustment ring 65 is diametrically dimensioned so as to be rotatably around the outer surface of the section 61e, and the ring 65 is shown to be provided with a pair of inwardly projecting pins 65a extending radially therefrom. Such inwardly projecting pins 65a can extend through T-shaped slots 61f formed in the small diameter section 61e and each having a stem opening at the free edge of the section 61e. The inwardly projecting pins 65a are sufficiently long so that the inner ends thereof can slidably engage in respective helically arranged grooves 64a formed in the outer surface of the lens holder 64. The eye cap holder 66 is dimensioned to fit over the free end portion of the smaller diameter section 61e and has diametrically opposed openings 66a positioned to be engaged by claws 61g extending outwardly from the section 61e. The lens holder 64 is further formed, in its outer surface, with a pair of axially extending grooves 64b which receive axial guide projections 61h extending inwardly from the inner surface of the section 61e of the holder 61. The engagement of the projections 61h in the grooves 64b serves to rotatably couple the lens holder 64 and the finder holder 61 while permitting relative axial displacements thereof. By reason of the engagement of the pins 65a of the lens adjustment ring 65 in the helical grooves 64a of the lens holder 64, a rotational force exerted on the lens holder 64 through the lens adjustment ring 65 is converted into an axial thrust for shifting the lens holder 64, and hence the lens 63 therein, in the axial direction.

In the illustrated embodiment of the invention, the focal distance of the lens 63 is selected so that the screen of the CRT 51 can be brought into focus when viewed through the eye piece assembly 60 only if the finder holder 61 is in an expanded condition in which it is shifted away from the viewing screen assembly 50. In other words, when the viewfinder 9 is in a contracted condition with the finder holder 61 shifted toward the viewing screen assembly 50, the lens 63 is maintained out of focus in respect to the screen of the CRT 51.

The described viewfinder 9 embodying this invention is constructed to be maintained in its contracted condition by restricting movement of each of the connecting pins 54 along the respective slot 61b in the axial expanding direction by means of a projection 61b' resiliently projecting into the foot or circumferencially extending end portion of each L-shaped slot 61b. On the other hand, the viewfinder 9 can be maintained in its expanded condition by restricting the movement of each of the connecting pins 54 along the respective slot 61b by means of a projection 61b extending resiliently into each L-shaped slot 61b near to the end of the axially directed portion thereof.

Figure 21A:
FIGS. 21A and 21B are perspective views illustrating use of the viewfinder in different respective positions relative to the body of the unified video camera and VCR.
Figure 21B:
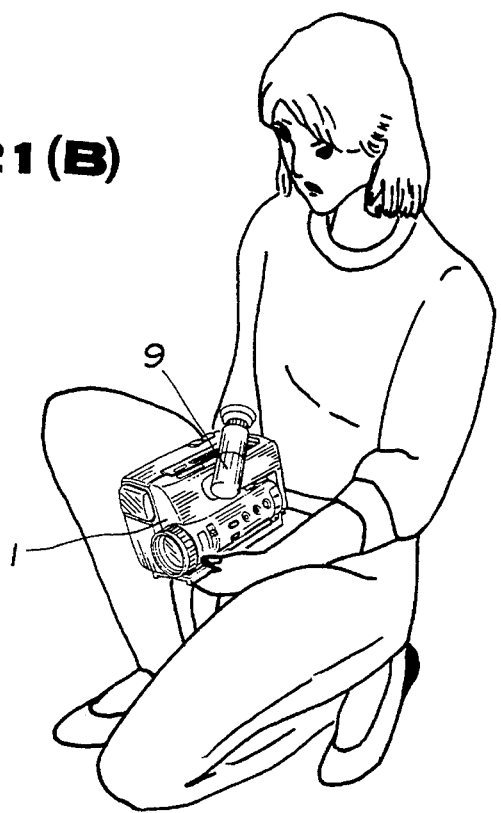

With the arrangement of the viewfinder 9 as described above, the latter can be stored, when not in use, in its contracted condition so as to be wholly contained within the recess 4b of the body 2, whereby to minimize the overall dimensions of the unified video camera and VCR 1. In such stored position, the lens 63 is not focused in respect to the screen of the CTR 51. On the other hand, when operating the unified video camera and VCR 1, the viewfinder 9 is manipulated to its expanded condition so that an eye cap 67 (FIG. 16) mounted on the eye cap holder 66 extends well beyond the camera body 2 for easy access by the operator's eye. Furthermore, by reason of the pivotal mounting of the viewfinder 9 on the body 2, the pivotal position of the viewfinder 9 can be selected for convenient use thereof when operating the unified video camera and VCR from an erect position (FIG. 21A) or from a low or crouching position (FIG. 21B).

As shown on FIG. 3, circuit boards generally indicated at 200 are preferably separated into a group of circuit boards 202 for the video camera functions, and a group of circuit boards 204 for the VCR functions. Such arrangement or layout of the circuit boards in two groups 202 and 204 makes it possible to reduce the number of circuit elements and thereby assist in minimizing the size of the unified video camera and VCR.

It will be further appreciated that, in the unified video camera and VCR according to this invention, the mass and size of the apparatus have been substantially reduced without giving rise to difficulties in conveniently arranging the various switches and buttons required for controlling the operations of the video camera unit and the VCR unit.

Although a preferred embodiment of this invention has been described in detail herein with reference to the accompanying drawings, it is to be understood that the invention is not limited thereto, and that various changes and modifications may be effected therein by one skilled in the art without departing from the scope or spirit of the invention as defined in the appended claims.

What is claimed is:

1. A unified video camera and video cassette recording and/or reproducing apparatus, comprising:

a hollow body defining an interior space having a longitudinally extending median plane and an opening along the top and a side of said body to one side of said plane;

a video camera unit including a camera lens assembly disposed in said interior space and being offset toward the other side of said median plane;

a video cassette recording and/or reproducing unit disposed in said interior space and being offset toward said one side of said median plane in longitudinally overlapping relation to said video camera unit, said video cassette recording and/or reproducing unit including a cassette holder compartment movable between a loading position wholly within said body and an eject position in which a video cassette in said holder compartment projects out of said opening;

a grip strap extending along the exterior of said body at said side and being attached, at its ends, to a lower portion of said body so that an operator's hand can extend upwardly between said strap and said side of the body for cradling said body in the palm of such hand;

a lid mounted on said body for movement between a closed position for closing said opening at the top of said body when said cassette holder compartment is in said loading position and an opened position leaving said opening unobstructed for movement of said cassette holder compartment to said eject position; and said camera lens assembly has a power zoom mechanism and zoom control switch means for said power zoom mechanism mounted on said lid so that, in said closed position of the lid, said zoom control switch means are actuable by fingers of the operator's hand cradling said body.

2. A unified video camera and video cassette recording and/or reproducing apparatus as in claim 1; wherein said lid is pivoted on said body for angular displacements between said opened and closed positions about an axis adjacent said median plane, and said lid has an angled edge portion along a side thereof remote from said axis of pivoting and which, in said closed position of the lid, downwardly overlaps an edge portion of said body adjacent said opening for preventing pinching of the operator's fingers between said edge portion of the body and said lid.

3. A unified video camera and video cassette recording and/or reproducing apparatus, comprising:

a hollow body defining an interior space having a longitudinally extending median plane and an opening along the top and a side of said body to one side of said plane;

a video camera unit including a camera lens assembly disposed in said interior space and being offset toward the other side of said median plane;

a video cassette recording and/or reproducing unit disposed in said interior space and being offset toward said one side of said median plane in longitudinally overlapping relation to said video camera unit, said video cassette recording and/or reproducing unit including a cassette holder compartment movable between a loading position wholly within said body and an eject position in which a video cassette in said holder compartment projects out of said opening;

a grip strap extending along the exterior of said body at said side and being attached, at its ends, to a lower portion of said body so that an operator's hand can extend upwardly between said strap and said side of the body for cradling said body in the palm of such hand;

a record start and stop switch disposed at the outside of a rear portion of said body at said one side of said median plane so as to be actuable by a thumb of the operator's hand cradling said body;

lock means associated with said start and stop switch and being movable between a locking position for locking said start and stop switch in a stop condition and a stand-by position in which said start and stop switch is actuable to a record start condition, and including a rotary member movable between a first angular position corresponding to said locking position and a second angular position corresponding to said stand-by position; and said rotary member has a radial extension which, in said second angular position, is oriented to provide a rest for the operator's thumb.

4. A unified video camera and video cassette recording and/or reproducing apparatus, comprising:

a hollow body defining an interior space having a longitudinally extending median plane and an opening along the top and a side of said body to one side of said plane;

a video camera unit including a camera lens assembly disposed in said interior space and being offset toward the other side of said median plane;

a video cassette recording and/or reproducing unit disposed in said interior space and being offset toward said one side of said median plane in longitudinally overlapping relation to said video camera unit, said video cassette recording and/or reproducing unit including a cassette holder compartment movable between a loading position wholly within said body and an eject position in which a video cassette in said holder compartment projects out of said opening, wherein said cassette holder compartment has a cover plate movable therewith and extending over an outer side of said cassette holder compartment so as to form a respective portion of the surface of said side of the body when said cassette holder compartment is in said loading position thereof;

a grip strap extending along the exterior of said body at said side and being attached, at its ends, to a lower portion of said body so that an operator's hand can extend upwardly between said strap and said side of the body for cradling said body in the palm of such hand; and a lid pivoted on said body for angular displacements about an axis adjacent said median plane at the top of said body between a closed position for closing said opening at the top of the body when said cassette holder compartment is in said loading position and an opened position leaving said opening unobstructed for movement of said cassette holder compartment to said eject position, said lid having a downwardly angled edge portion along a side thereof remote from said axis of pivoting and which overlaps an upper edge portion of said cover plate when said lid is moved to said closed position with said cassette holder compartment in said loading position.

5. A unified video camera and video cassette recording and/or reproducing apparatus, comprising:

a hollow body defining an interior space having a longitudinally extending median plane and an opening along the top and a side of said body to one side of said plane;

a video camera unit including a camera lens assembly disposed in said interior space and being offset toward the other side of said median plane;

a video cassette recording and/or reproducing unit disposed in said interior space and being offset toward said one side of said median plane in longitudinally overlapping relation to said video camera unit, said video cassette recording and/or reproducing unit including a cassette holder compartment movable between a loading position wholly within said body and an eject position in which a video cassette in said holder compartment projects out of said opening;

a grip strap extending along the exterior of said body at said side and being attached, at its ends, to a lower portion of said body so that an operator's hand can extend upwardly between said strap and said side of the body for cradling said body in the palm of such hand;

a lid mounted on said body for movement between a closed position for closing said opening at the top of the body when said cassette holder compartment is in said loading position and an opened position leaving said opening unobstructed for movement of said cassette holder compartment to said eject position; and eject control means actuable for causing said movement of the cassette holder compartment to said eject position, said eject control means being disposed at the top of said body in a location covered by said lid in said closed position of said lid so that said eject control means is accessible for actuating said eject control means only when said lid is in said opened position.

6. A unified video camera and video cassette recording and/or reproducing apparatus, comprising:

a hollow body defining an interior space having a longitudinally extending median plane and an opening along the top and a side of said body to one side of said plane;

a video camera unit including a camera lens assembly disposed in said interior space and being offset toward the other side of said median plane;

a video cassette recording and/or reproducing unit disposed in said interior space and being offset toward said one side of said median plane in longitudinally overlapping relation to said video camera unit, said video cassette recording and/or reproducing unit including a cassette holder compartment movable between a loading position wholly within said body and an eject position in which a video cassette in said holder compartment projects out of said opening and wherein said cassette holder compartment includes a cassette holder and a cover plate movable therewith and extending over an outer side of said cassette holder compartment so as to form a respective portion of the surface of said side of the body when said cassette holder compartment is in said loading position, and mounting means for said cassette holder displacing said cassette holder laterally upwardly and outwardly, in respect to said body when said cassette holder compartment is moved to said eject position so as to facilitate manual insertion and removal of a cassette in said holder when in said eject position; and a grip strap extending along the exterior of said body at said side and being attached, at its ends, to a lower portion of said body so that an operator's hand can extend upwardly between said strap and said side of the body for cradling said body in the palm of such hand.

7. A unified video camera and video cassette recording and/or reproducing apparatus, comprising:

a hollow body defining an interior space having a longitudinally extending median plane and an opening along the top and a side of said body to one side of said plane;

a video camera unit including a camera lens assembly disposed in said interior space and being offset toward the other side of said median plane;

a video cassette recording and/or reproducing unit disposed in said interior space and being offset toward said one side of said median plane in longitudinally overlapping relation to said video camera unit, said video cassette recording and/or reproducing unit including a cassette holder compartment movable between a loading position wholly within said body and an eject position in which a video cassette in said holder compartment projects out of said opening;

a viewfinder disposed at said other side of said median plane above said video camera unit, said viewfinder being variable in axial length in a slidably telescopic manner between a retracted condition when not in use and an expanded operative condition in which said viewfinder is substantially longer than said body;

a lid mounted on said body for movement between a closed position for closing said opening at the top of the body when said cassette holder compartment is in said loading position and an opened position leaving said opening unobstructed for movement of said cassette holder compartment to said eject position;

a grip strap extending along the exterior of said body at said side and being attached, at its ends, to a lower portion of said body so that an operator's hand can extend upwardly between said strap and said side of the body for cradling said body in the palm of such hand; and wherein said camera lens assembly has a power zoom mechanism and zoom control switch means for said power zoom mechanism mounted on said lid so that, in said closed position of the lid, said zoom control switch means are actuable by fingers of the operator's hand cradling said body.

8. A unified video camera and video cassette recording and/or reproducing apparatus as in claim 7; wherein said lid is pivoted on said body for angular displacements between said opened and closed positions about an axis adjacent said median plane, and said lid has an angled edge portion along a side thereof remote from said axis of pivoting and which, in said closed position of the lid, downwardly overlaps an edge portion of said body adjacent said opening for preventing pinching of the operator's fingers between said edge portion of the body and said lid.

9. A unified video camera and video cassette recording and/or reproducing apparatus as in claim 8; further comprising a first array of switches for controlling operations of said video camera unit, and a second array of switches for controlling operations of said video cassette recording and/or reproducing unit, said first and second arrays of switches being arranged at the outside of said body at said other side of said median plane.

10. A unified video camera and video cassette recording and/or reproducing apparatus as in claim 9; further comprising a record start and stop switch disposed at the outside of a rear portion of said body at said one side of the median plane so as to be actuable by a thumb of the operator's hand cradling the body.

11. A unified video camera and video cassette recording and/or reproducing apparatus as in claim 10; further comprising lock means associated with said start and stop switch and being movable between a locking position for locking said start and stop switch in a stop condition and a stand-by position in which said start and stop switch is actuable to a record start condition.

12. A unified video camera and video cassette recording and for reproducing apparatus as in claim 11; wherein said lock means includes a rotary member movable between a first angular position corresponding to said locking position and a second angular position corresponding to said stand-by position.

13. A unified video camera and video cassette recording and/or reproducing apparatus as in claim 12; wherein said rotary member has a radial extension which, in said second angular position, is oriented to provide a rest for the operator's thumb.

14. A unified compact video camera and video cassette recording and/or reproducing apparatus, comprising:

a hollow body defining an interior space having a longitudinally extending median plane and an opening along the top and a side of said body to one side of said plane;

a video camera unit including a camera lens assembly disposed in said interior space and being offset toward the other side of said median plane;

a video cassette recording and/or reproducing unit disposed in said interior space and being offset toward said one side of said median plane in longitudinally overlapping relation to said video camera unit, said video cassette recording and/or reproducing unit including a cassette holder compartment movable between a loading position wholly within said body and an eject position in which a video cassette in said holder compartment projects out of said opening, said cassette holder compartment having a cassette holder and a cover plate movable therewith and extending over an outer side of said cassette holder compartment so as to form a respective portion of said side of the body when said cassette holder compartment is in said loading position thereof; and a grip holding member extending along the exterior of said body at the outside of said cover plate, and connecting means for connecting the ends of said grip holding member, respectively to said body in front, and in back of said cover plate so that an operator's hand can extend upwardly between said grip holding member and said side of the body for cradling said body in the palm of such hand.

15. A unified compact video camera and video cassette recording and/or reproducing apparatus as in claim 14; further comprising a lid pivoted on said body for angular displacements about an axis adjacent said median plane at the top of said body between a closed position for closing said opening at the top of the body when said cassette holder compartment is in said loading position and an opened position leaving said opening unobstructed for movement of said cassette holder compartment to said eject position, said lid having a downwardly angled edge portion along a side thereof remote from said axis of pivoting and which overlaps an upper edge portion of said cover plate when said lid is moved to said closed position with said cassette holder compartment in said loading position.

16. A unified compact video camera and video cassette recording and/or reproducing apparatus as in claim 15; wherein said camera lens assembly has a power zoom mechanism and zoom control switch means for said power zoom mechanism mounted on said lid so that, in said closed position of the lid, said zoom control switch means are actuable by fingers of the operator's hand cradling said body.

17. A unified compact video camera and video cassette recording and/or reproducing apparatus as in claim 32; further comprising eject control means actuable for causing said movement of the cassette holder compartment to said eject position, said eject control means being disposed at the top of said body in a location covered by said lid in said closed position of said lid so that said eject control means is accessible for actuating said eject control means only when said lid is in said opened position.

18. A unified compact video camera and video cassette recording and/or reproducing apparatus as in claim 17; further comprising mounting means for said cassette holder displacing the latter laterally upwardly and outwardly, in respect to said body when said cassette holder compartment is moved to said eject position so as to facilitate manual insertion and removal of a cassette in said holder when in said eject position.

* * * * *